US012601473B2

(12) United States Patent
Xingping et al.

(10) Patent No.: US 12,601,473 B2
(45) Date of Patent: Apr. 14, 2026

(54) INLINE CONNECTOR

(71) Applicant: WANGS ALLIANCE CORPORATION, Port Washington, NY (US)

(72) Inventors: Gong Xingping, Qingxi Dongguan (CN); Lian Junhui, Qingxi Dongguan (CN)

(73) Assignee: Wangs Alliance Corporation

(*) Notice: Subject to any disclaimer, the term of this patent is extended or adjusted under 35 U.S.C. 154(b) by 0 days.

(21) Appl. No.: 19/001,119

(22) Filed: Dec. 24, 2024

(65) Prior Publication Data

US 2026/0016149 A1 Jan. 15, 2026

Related U.S. Application Data

(60) Provisional application No. 63/670,273, filed on Jul. 12, 2024.

(51) Int. Cl.
*F21V 23/06* (2006.01)
*F21S 2/00* (2016.01)
(Continued)

(52) U.S. Cl.
CPC .............. *F21V 23/06* (2013.01); *F21S 2/005* (2013.01); *F21S 4/24* (2016.01); *F21V 21/005* (2013.01);
(Continued)

(58) Field of Classification Search
CPC .. F21S 4/24; F21S 2/005; F21V 23/06; F21V 21/005; H01R 13/5208
See application file for complete search history.

(56) References Cited

U.S. PATENT DOCUMENTS 6,013,988 A 1/2000 Bucks et al.
6,147,458 A 11/2000 Bucks et al.
(Continued)

FOREIGN PATENT DOCUMENTS

CN 205979248 2/2017
EP 2730834 5/2014
(Continued)

OTHER PUBLICATIONS

InvisiLED® Outdoor RGBWW Wet Rated, Color changing and Adjustable CCT LED Tape, www.waclighting.com, May 2024.
(Continued)

*Primary Examiner* — William N Harris
(74) *Attorney, Agent, or Firm* — Weiss & Arons LLP

(57) ABSTRACT

Apparatus, methods and systems for connecting segments of a light tape. The light tape may include a first segment extending along an axis. The first segment may include a first male connector connected to a first end of the segment. The first male connector may include a conductor pin, an extension defining a groove and a sealing ring seated in the groove. The first segment may include a first female connector connected to a second end of the segment. The first female connector may include a hole for receiving the conductor pin and a receptacle for receiving the extension. The first male connector may be releasably interlocked with a second female connector connected to a second segment. The first male connector and the second female connector may releasably interlocked along the axis, without rotation of the second female connector relative to the first male connector about the axis.

28 Claims, 15 Drawing Sheets

(51) Int. Cl.

| | |
|---|---|
| ***F21S 4/24*** | (2016.01) |
| ***F21V 21/005*** | (2006.01) |
| ***F21V 23/00*** | (2015.01) |
| ***F21Y 103/10*** | (2016.01) |
| ***F21Y 113/13*** | (2016.01) |
| ***F21Y 115/10*** | (2016.01) |
| ***H01R 13/52*** | (2006.01) |
| ***H01R 13/627*** | (2006.01) |

(52) U.S. Cl.

CPC ......... *F21V 23/002* (2013.01); *H01R 13/521* (2013.01); *H01R 13/6273* (2013.01); *F21Y 2103/10* (2016.08); *F21Y 2113/13* (2016.08); *F21Y 2115/10* (2016.08)

(56) References Cited

U.S. PATENT DOCUMENTS

| | | | |
|---|---|---|---|
| 6,149,283 | A | 11/2000 | Conway et al. |
| 6,586,890 | B2 | 7/2003 | Min et al. |
| 6,788,011 | B2 | 9/2004 | Mueller et al. |
| 6,806,659 | B1 | 10/2004 | Mueller et al. |
| 7,015,825 | B2 | 3/2006 | Callahan |
| 7,038,399 | B2 | 5/2006 | Lys et al. |
| 7,204,608 | B2 | 4/2007 | Beeman et al. |
| 7,233,115 | B2 | 6/2007 | Lys |
| 7,256,554 | B2 | 8/2007 | Lys |
| 7,547,113 | B2 | 6/2009 | Lee |
| 7,737,643 | B2 | 6/2010 | Lys |
| 7,847,486 | B2 | 12/2010 | Ng |
| 8,148,912 | B2 | 4/2012 | Kim |
| 8,598,793 | B2 | 12/2013 | Yan et al. |
| 8,773,024 | B2 | 7/2014 | Yan et al. |
| 8,810,141 | B2 | 8/2014 | Takeda et al. |
| 8,926,145 | B2 | 1/2015 | Lynch et al. |
| 9,204,519 | B2 | 12/2015 | Gan et al. |
| 9,247,597 | B2 | 1/2016 | Miskin et al. |
| 9,306,139 | B2 | 4/2016 | Lee et al. |
| 9,609,711 | B2 | 3/2017 | Jiang et al. |
| 9,644,828 | B1 | 5/2017 | May |
| 9,681,512 | B1 | 6/2017 | Xiong |
| 9,730,282 | B2 | 8/2017 | Munday et al. |
| 10,094,547 | B2 | 10/2018 | Hierzer |
| 10,143,048 | B2 | 11/2018 | Hierzer |
| 10,180,218 | B2 | 1/2019 | Hierzer |
| 10,234,091 | B1 | 3/2019 | Chaimberg et al. |
| 10,299,321 | B1 | 5/2019 | Trask et al. |
| 10,378,747 | B1 | 8/2019 | Hanslip |
| 10,631,386 | B1 | 4/2020 | McRae |
| 10,842,895 | B1 | 11/2020 | Espina et al. |
| 10,941,930 | B2 | 3/2021 | Hatch et al. |
| 2007/0019415 | A1 | 1/2007 | Leblanc et al. |
| 2008/0203936 | A1 | 8/2008 | Mariyama et al. |
| 2009/0009997 | A1 | 1/2009 | Sanfilippo et al. |
| 2009/0021185 | A1 | 1/2009 | Ng |
| 2009/0206762 | A1 | 8/2009 | Gibboney |
| 2010/0008090 | A1* | 1/2010 | Li .......................... F21V 23/06 362/249.02 |
| 2010/0259200 | A1 | 10/2010 | Beausoleil |
| 2010/0271804 | A1 | 10/2010 | Levine |
| 2011/0037407 | A1 | 2/2011 | Ahn et al. |
| 2011/0121752 | A1 | 5/2011 | Newman, Jr. et al. |
| 2012/0235582 | A1 | 9/2012 | Ido |
| 2013/0063035 | A1 | 3/2013 | Baddela |
| 2013/0127356 | A1 | 5/2013 | Tanaka et al. |
| 2013/0162150 | A1 | 6/2013 | Masuda |
| 2013/0215610 | A1 | 8/2013 | Tsai et al. |
| 2013/0249437 | A1 | 9/2013 | Wang et al. |
| 2014/0265923 | A1* | 9/2014 | Le Toquin ............. H05B 45/20 315/297 |
| 2014/0300285 | A1 | 10/2014 | Medak |
| 2014/0361697 | A1 | 12/2014 | Miskin et al. |
| 2014/0362566 | A1 | 12/2014 | Tischler et al. |
| 2015/0022114 | A1 | 1/2015 | Kim |
| 2015/0028776 | A1 | 1/2015 | McMillan |
| 2015/0077991 | A1 | 3/2015 | Palfreyman et al. |
| 2015/0115823 | A1 | 4/2015 | Serra |
| 2016/0091147 | A1* | 3/2016 | Jiang ......................... F21K 9/27 315/200 R |
| 2016/0174325 | A1 | 6/2016 | Monjo |
| 2017/0171929 | A1 | 6/2017 | Erdener et al. |
| 2017/0171932 | A1 | 6/2017 | Puvanakijjakorn |
| 2017/0374718 | A1 | 12/2017 | Fang et al. |
| 2018/0031184 | A1 | 2/2018 | Yingchun |
| 2018/0376555 | A1 | 12/2018 | Wang |
| 2019/0032906 | A1* | 1/2019 | Webb ...................... F21S 43/14 |
| 2019/0098723 | A1 | 3/2019 | Sadwick et al. |
| 2019/0211983 | A1 | 7/2019 | Shine et al. |
| 2019/0293270 | A1 | 9/2019 | Ansems et al. |
| 2020/0389955 | A1 | 12/2020 | Price et al. |
| 2021/0123571 | A1 | 4/2021 | Cisneros et al. |
| 2022/0053617 | A1 | 2/2022 | Zhang et al. |
| 2022/0201820 | A1 | 6/2022 | Kumar et al. |

FOREIGN PATENT DOCUMENTS

| | | |
|---|---|---|
| JP | WO2011/065047 | 6/2011 |
| JP | 2011165394 | 8/2011 |
| JP | 2013254665 | 12/2013 |
| KR | 1020120135003 | 12/2012 |
| RU | 2358354 | 12/2008 |
| WO | WO99/07187 | 2/1999 |
| WO | WO00/02421 | 1/2000 |
| WO | WO2011143510 | 11/2011 |
| WO | WO2014108870 | 7/2014 |
| WO | WO2015041530 | 3/2015 |

OTHER PUBLICATIONS

InvisiLED® Outdoor Pro+ Wet Rated LED Tape, www.waclighting.com, Dec. 2023.

12VAC Landscape Outdoor Tape Wet Rated LED Tape, www.waclighting.com, May 2024.

"Low Drop Fixed and Adjustable Positive Voltage Regulators," Unisonic Technologies Co., Ltd, Nov. 14, 2016.

IDRIVER ID2006 Data Sheet, Oct. 2019. (Uncertified partial English language translation attached herewith.).

"ME32S003AF6P7 Data Sheet," www.mesilicon.com, Nov. 27, 2019. (Uncertified partial English language translation attached herewith.).

* cited by examiner

INLINE CONNECTOR

CROSS-REFERENCE TO RELATED APPLICATIONS

This application is a nonprovisional of U.S. Provisional Application No. 63/670,273 filed Jul. 12, 2024, which is hereby incorporated by reference herein in its entirety.

BACKGROUND

Light tape is often installed in settings in which the light tape is placed against surfaces, at joints between surfaces, in crevices, in tubes, and the like. Light tape may be installed in a setting that is difficult to access. Light tape may be installed in a setting in which it is obscured from view or difficult to view.

Typical end-to-end light tape connectors may be incompatible with typical installation settings.

FIG. 1 shows a prior art connector 100 that has a threaded connection between connector 102 and connector 104. The threaded connection requires either relative rotation of the parts or a rotating nut.

FIG. 2 shows a prior art connector 200 that includes inline mechanical connection 202 between two parts and out of line electrical connection 204 between the two parts.

It would be desirable, therefore, to provide apparatus and methods for inline connection of lengths of light tape.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

Figure 1:
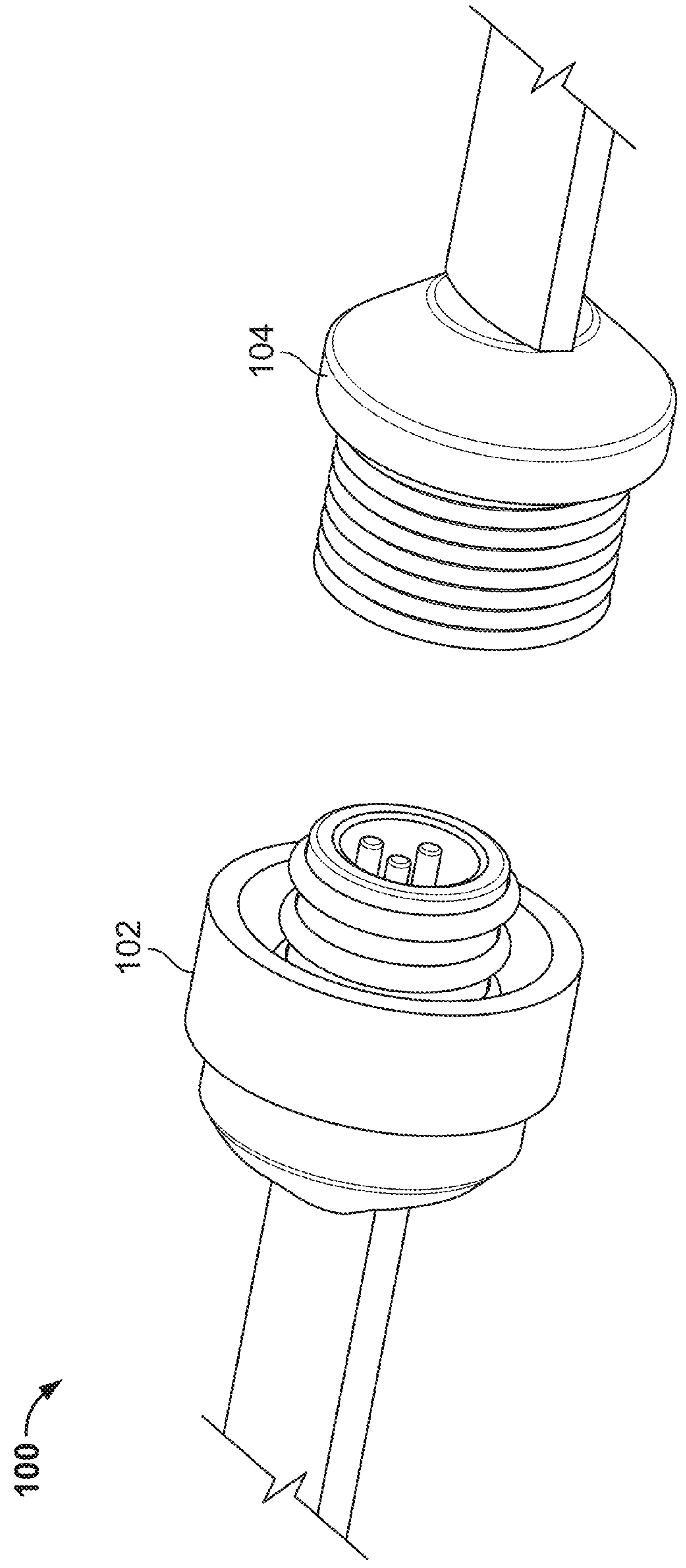
FIG. 1 PRIOR ART
FIG. 1 shows schematically illustrative apparatus in accordance with the principles of the invention.
Figure 2:
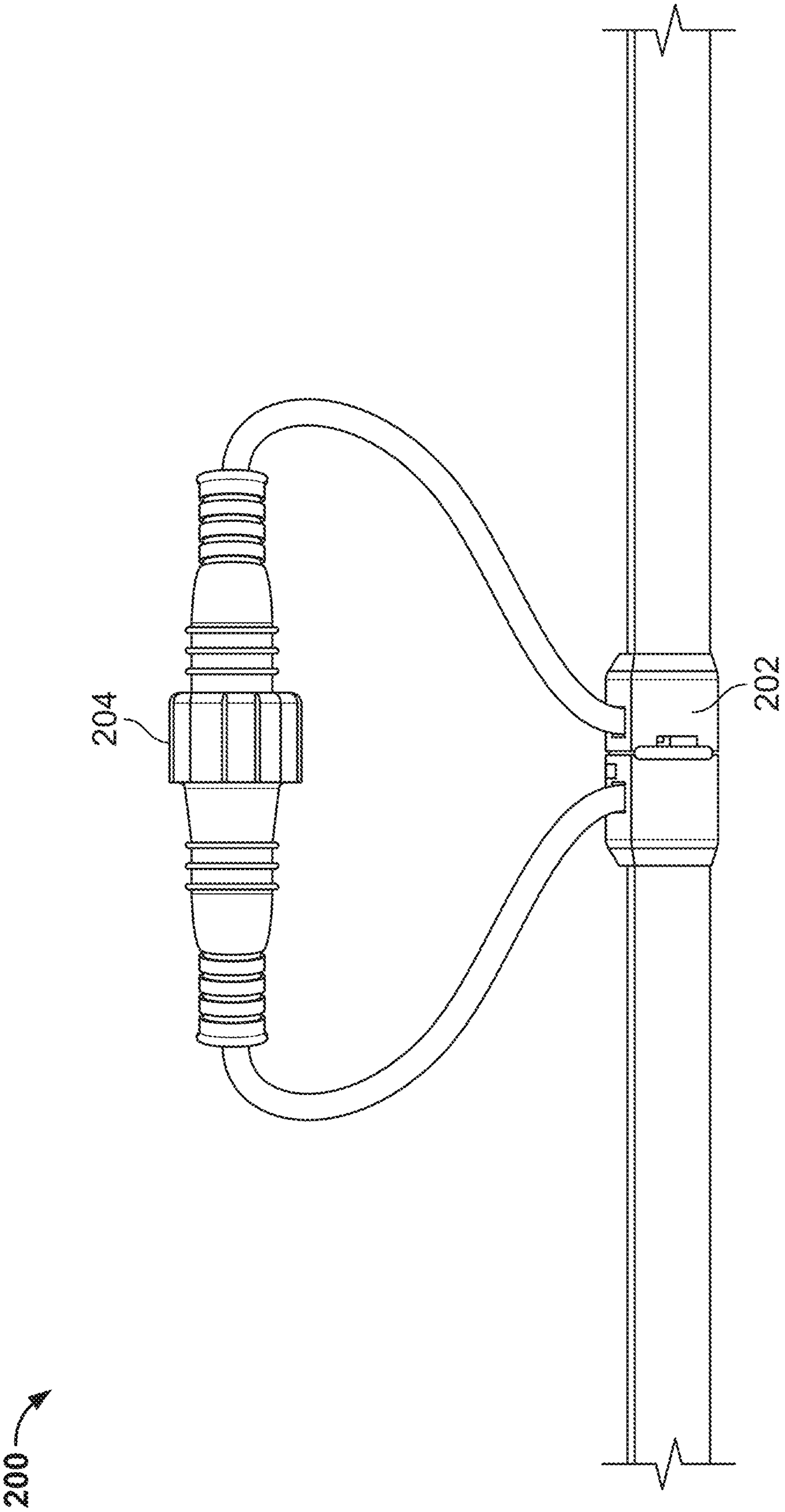
FIG. 2 PRIOR ART
FIG. 2 shows schematically illustrative apparatus in accordance with the principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus, methods and systems for providing light are provided.

The apparatus may include a light tape. The light tape may include a first segment. The first segment may extend along an axis. The axis may be a central axis. The axis may be a curvilinear axis. The axis may be a longitudinal axis. A direction in which the axis extends may be an axial direction. The axial direction may be a longitudinal direction. The axial direction may be a linear direction.

The first segment may include a light emitting diode ("LED"). The first segment may include a first end. The first segment may include a second end. The first end may be parallel to the second end.

The first segment may include a first male connector. The first male connector may be connected to the first end. The first male connector may include a conductor pin. The first male connector may include an extension. The extension may define a groove. The extension may define a groove on an exterior surface of the extension. The first male connector may include a sealing ring. The sealing ring may be seated in the groove.

The first segment may include a first female connector. The first female connector may be connected to the second end. The first female connector may include a hole. The hole may receive the conductor pin. The first female connector may include a receptacle. The receptacle may receive the extension.

The extension may define a first bore. The conductor pin may be disposed inside the first bore. The conductor pin may be a conductor pin that does not extend beyond the first bore. The receptacle may define a second bore. The hole may be disposed inside the second bore. The hole may be a hole that does not extend beyond the second bore.

The conductor pin may be included in an array of conductor pins. Conductor pins may include any suitable copper, aluminum or any other conductive material pin, extension, contact, protrusion and the like. The hole may be included in an array of holes. Each hole included in the array of holes may receive a conductor pin from the array of conductor pins. Each hole may be sized to receive a conductor pin. Each conductor pin may fit into a corresponding hole.

The first male connector may be releasably interlocked with a second female connector. The second female connector may be connected to a second segment. The second female connector may have one or more features in common with the first female connector. The first male connector may be releasably interlocked, along the axis, with the second female connector. The first male connector and the second female connector may be releasably interlocked without rotation of the second female connector relative to the first male connector about the axis.

The first male connector may include a male electrical connector. The first male connector may include a male mechanical connector. The first male connector may include a female mechanical connector. The second female connector may include a female electrical connector. The second female connector may include a female mechanical connector. The second female connector may include a male mechanical connector.

Interlocking the first male connector with the second female connector may mechanically connect the first segment and the second segment. Interlocking the first male connector with the second female connector may electrically connect the first segment and the second segment. Interlocking the first male connector with the second female connector may mechanically and electrically connect the first segment and the second segment.

The first male connector and the second female connector may interlock in response to a pushing force exerted along the axis. The first male connector and the second female connector may interlock in response to any suitable force that brings the first segment and the second segment together. A fit between the first male connector and the second female connector may be a snug fit. The fit between the first male connector and the second female connector may be a loose fit. The fit between the first male connector and the second female connector may be any suitable fit.

The first male connector may be released from the second female connector in response to a tensile force exerted along the axis. The first male connector may be released from the second female connector in response to a pulling force exerted along the axis. The first male connector may be released from the second female connector solely in response to the tensile force exerted along the axis. The first male connector may be released from the second female connector solely in response to the pulling force exerted along the axis. The first male connector may be released from the second female connector without a rotational force about the axis. The first male connector may be released from the second female connector with a rotational force about the axis. The first male connector and the second female connector may be released with any suitable force that separates the first segment from the second segment.

The first female connector may be releasably interlocked with a second male connector. The second male connector may be connected to a third segment. The second male connector may have one or more features in common with the first male connector. The first female connector and the second male connector may be releasably interlocked without rotation of the second male connector relative to the first female connector about the axis.

The first female connector may include a female electrical connector. The first female connector may include a female mechanical connector. The first female connector may include a male mechanical connector. The second male connector may include a male electrical connector. The second male connector may include a male mechanical connector. The second male connector may include a female mechanical connector.

Interlocking the first female connector with the second male connector may mechanically connect the first segment and the third segment. Interlocking the first female connector with the second male connector may electrically connect the first segment and the third segment. Interlocking the first female connector with the second male connector may mechanically and electrically connect the first segment and the third segment.

The first female connector and the second male connector may interlock in response to a pushing force exerted along the axis. The first female connector and the second male connector may interlock in response to any suitable force that brings the first segment and the third segment together. A fit between the first female connector and the second male connector may be a snug fit. The fit between the first female connector and the second male connector may be a loose fit. The fit between the first female connector and the second male connector may be any suitable fit.

The first female connector may be released from the second male connector in response to a tensile force exerted along the axis. The first female connector may be released from the second male connector in response to a pulling force exerted along the axis. The first female connector may be released from the second male connector solely in response to the tensile force exerted along the axis. The first female connector may be released from the second male connector solely in response to the pulling force exerted along the axis. The first female connector may be released from the second male connector without a rotational force about the axis. The first female connector may be released from the second male connector with a rotational force about the axis. The first female connector and the second male connector may be released with any suitable force that separates the first segment from the third segment.

The first male connector and the second female connector may include locking features. The fit between the first male connector and the second female connector may be a snug fit even in the absence of the locking features. The fit between the first male connector and the second female connector may be a loose fit even in the absence of the locking features. The locking features may include a first tang. The first tang may extend from a top side of the first male connector. The first tang may extend in generally the same direction as the axial direction. The first tang may be a tang that does not extend in a direction away from the axial direction. The first tang may be a tang that does not extend past a perimeter of the first male connector. The locking features may include a second tang. The second tang may extend from a bottom side of the first male connector. The second tang may be parallel to the first tang. The second tang may extend in generally the same direction as the axial direction. The second tang may be a tang that does not extend in a direction away from the axial direction. The second tang may be a tang that does not extend past a perimeter of the first male connector.

The locking features may include a first cutout. The first cutout may be on a top side of the second female connector. The first cutout may be an angled cutout. The first cutout may include a bevel. The locking features may include a second cutout. The second cutout may be on a bottom side of the second female connector. The second cutout may be an angled cutout. The second cutout may include a bevel.

When the first male connector is releasably interlocked with the second female connector, the first cutout may receive the first tang. When the first male connector is releasably interlocked with the second female connector, the second cutout may receive the second tang.

When the pushing force is exerted on the first segment and the second segment, the first tang may be pushed into the first cutout and the second tang may be pushed into the second cutout. The first tang may include first tabs. The first tabs may include a first tab. The first tabs may include a second tab. The second tang may include second tabs. The second tabs may include a third tab. The second tabs may include a fourth tab. The first cutout may include first ledges.

The first ledges may include a first ledge. The first ledges may include a second ledge. The second cutout may include second ledges. The second ledges may include a third ledge. The second ledges may include a fourth ledge.

The first ledges may engage the first tabs. When the first ledges engage the first tabs, the first ledge may engage the first tab. When the first ledges engage the first tabs, the second ledge may engage the second tab. The second ledges may engage the second tabs. When the second ledges engage the second tabs, the third ledge may engage the third tab. When the second ledges engage the second tabs, the fourth ledge may engage the fourth tab. Engagement of the first and second tabs by the first and second ledges may lock the first segment to the second segment. Engagement of the first tabs by the first ledges may prevent the first tabs from being released from the first ledges without a tensile or pulling force. Engagement of the second tabs by the second ledges may prevent the second tabs from being released from the second ledges without a tensile or pulling force that is strong enough to mechanically separate the first and second tabs from the first and second ledges.

When first and second ledges engage the first and second tabs, the first and second ledges may prevent the first segment from disconnecting from the second segment. When the first and second ledges engage the first and second tabs, the first segment may be attached to the second segment. The first and second tabs may be released from the first and second ledges with the tensile or pulling force. The tensile force may be strong enough to release the first and second tabs without applying rotational force to the first and second tangs. The tensile force may be strong enough to release the first and second tabs without applying a rotational force to the first and second ledges. Once the first and second tabs are released from the first and second ledges, the first segment may be detached from the second segment. Once the first and second tabs are released from the first and second ledges, the first segment may be withdrawn from the second segment.

The first and second tabs may be released from the first and second ledges with the tensile or pulling force and a rotational force. The rotational force may include rotation that is relative to the longitudinal axis. The rotational force may include rotation that is about the longitudinal axis. The rotational force may include any suitable rotation.

The first and second tabs may be released from the first and second ledges using a tool. The tool may pull the tang away from the cutout. The tool may release the tang from the cutout. The tool may be used to apply a pulling or tensile force on the tang. The tool may apply any suitable force to the tang and the cutout. The first and second tabs may be released from the first and second ledges without using a tool. The first and second tabs may be released from the first and second ledges using any suitable means.

The first and second tabs may remain oriented in the axial direction during engagement of the first and second ledges with the first and second tabs. The first and second tabs may deflect from the axial direction during engagement of the first and second ledges with the first and second tabs. The first and second ledges may be ledges that do not pop out or flex away from the axial direction during engagement of the first and second ledges with the first and second tabs. The first and second ledges may pop out or flex away from the axial direction during engagement of the first and second ledges with the first and second tabs. The first and second tabs and the first and second ledges may deform around each other during disengagement of the first and ledges from the first and second tabs. The first and second tabs and the first and second ledges may deform around each other, without deflection from the axial direction, during disengagement of the first and second ledges from the first and second tabs. The first and second tabs and the first and second ledges may deform around each other, with deflection from the axial direction, during disengagement of the first and second ledges from the first and second tabs.

The first female connector and the second male connector may include locking features. The fit between the first female connector and the second male connector may be a snug fit even in the absence of from the locking features. The fit between the first female connector and the second male connector may be a loose fit even in the absence from the locking features. The locking features may include a first tang. The first tang may extend from a top side of the second male connector. The first tang may be parallel to the first tang. The first tang may extend in generally the same direction as the axial direction. The first tang may be a tang that does not extend in a direction away from the axial direction. The first tang may be a tang that does not extend past a perimeter of the second male connector. The locking features may include a second tang. The second tang may extend from a bottom side of the second male connector. The second tang may be parallel to the first tang. The second tang may extend in generally the same direction as the axial direction. The second tang may be a tang that does not extend in a direction away from the axial direction. The second tang may be a tang that does not extend past a perimeter of the second male connector.

The locking features may include a first cutout. The first cutout may be on a top side of the first female connector. The first cutout may be an angled cutout. The first cutout may include a bevel. The locking features may include a second cutout. The second cutout may be on a bottom side of the first female connector. The second cutout may be an angled cutout. The second cutout may include a bevel.

When the second male connector is releasably interlocked with the first female connector, the first cutout may to receive the first tang. When the second male connector is releasably interlocked with the first female connector, the second cutout may receive the second tang.

When the pushing force is exerted on the first segment and the third segment, the first tang may be pushed into the first cutout and the second tang may be pushed into the second cutout. The first tang may include first tabs. The first tabs may include a first tab. The first tabs may include a second tab. The second tang may include second tabs. The second tabs may include a third tab. The second tabs may include a fourth tab. The first cutout may include first ledges. The first ledges may include a first ledge. The first ledges may include a second ledge. The second cutout may include second ledges. The second ledges may include a third ledge. The second ledges may include a fourth ledge.

The first ledges may engage the first tabs. When the first ledges engage the first tabs, the first ledge may engage the first tab. When the first ledges engage the first tabs, the second ledge may engage the second tab. The second ledges may engage the second tabs. When the second ledges engage the second tabs, the third ledge may engage the third tab. When the second ledges engage the second tabs, the fourth ledge may engage the fourth tab. Engagement of the second tabs by the second ledges may lock the first segment to the third segment. Engagement of the first tabs by the first ledges may prevent the first tabs from being released from the first ledges without a tensile or pulling force. Engagement of the second tabs by the second ledges may prevent the second tabs from being released from the second ledges without a tensile or pulling force that is strong enough to mechanically separate the first and second tabs from the first and second ledges.

When first and second ledges engage the first and second tabs, the first and second ledges may prevent the first segment from disconnecting from the third segment. When the first and second ledges engage the first and second tabs, the first segment may be attached to the third segment. The first and second tabs may be released from the first and second ledges with the tensile or pulling force. The tensile force may be strong enough to release the first and second tabs without applying rotational force to the first and second tangs. The tensile force may be strong enough to release the first and second tabs without applying a rotational force to the first and second ledges. Once the first and second tabs are released from the first and second ledges, the first segment may be detached from the third segment. Once the first and second tabs are released from the first and second ledges, the first segment may be withdrawn from the third segment.

The first and second tabs may be released from the first and second ledges with the tensile or pulling force and a rotational force. The rotational force may include rotation that is relative to the longitudinal axis. The rotational force may include rotation that is about the longitudinal axis. The rotational force may include any suitable rotation.

The first and second tabs may be released from the first and second ledges using a tool. The tool may pull the tang away from the cutout. The tool may release the tang from the cutout. The tool may be used to apply a pulling or tensile force on the tang. The tool may apply any suitable force to the tang and the cutout. The first and second tabs may be released from the first and second ledges without using a tool. The first and second tabs may be released from the first and second ledges using any suitable means.

The first and second tabs may remain oriented in the axial direction during engagement of the first and second ledges with the first and second tabs. The first and second tabs may deflect from the axial direction during engagement of the first and second ledges with the first and second tabs. The first and second ledges may be ledges that do not pop out or flex away from the axial direction during engagement of the first and second ledges with the first and second tabs. The first and second ledges may pop out or flex away from the axial direction during engagement of the first and second ledges with the first and second tabs. The first and second tabs and the first and second ledges may deform around each other during disengagement of the first and ledges from the first and second tabs. The first and second tabs and the first and second ledges may deform around each other, without deflection from the axial direction, during disengagement of the first and second ledges from the first and second tabs. The first and second tabs and the first and second ledges may deform around each other, with deflection from the axial direction, during disengagement of the first and second ledges from the first and second tabs.

The groove may be one of a plurality of grooves. The sealing ring may be one of a plurality of sealing rings. Each of the plurality of sealing rings may be seated in one of the plurality of grooves.

When the first male connector and the second female connector are releasably interlocked, the plurality of sealing rings may seal between the first segment and the second segment. When the first female connector and the second male connector are releasably interlocked, the plurality of sealing rings may seal between the first segment and the third segment. The plurality of sealing rings may prevent water and any other liquid from damaging any electronics and circuitry included in the first, second and third segments.

When the first male connector and the second female connector are releasably interlocked, connection between the first male connector and the second female connector may include a waterproof connection. When the first female connector and the second male connector are releasably interlocked, connection between the first female connector and the second male connector may include a waterproof connection. A waterproof connection may have an Ingress Protection ("IP") rating of IP66. An IP rating of IP66 may be a rating that indicates a product has been tested and meets a highest level of protection against solid and liquid particles. IP66 rated products may be suitable for use in environments with potential water exposure. The waterproof connection may have an IP rating higher than IP66. The waterproof connection may have an IP rating lower than IP66. The light tape may be suitable for indoor use. The light tape may be suitable for outdoor use.

The second segment may provide power to the first segment via a plurality of wires. The plurality of wires may include two wires. The plurality of wires may include six wires. The plurality of wires may include any other suitable amount of wires.

The first segment may include a first printed circuit board ("PCB"). The first PCB may include a first trace. The first trace may be included in a first plurality of traces. The first plurality traces may include copper traces, aluminum traces and any other suitable traces. Each conductor pin included in the array of conductor pins may be electronically connected to a trace from the first plurality of traces. Each conductor pin may be electronically connected to a trace from the first plurality of traces via one or more additional conductor pins and traces.

The second segment may include a second PCB. The second PCB may include a second trace. The second trace may be included a second plurality of traces. The second plurality of traces may include copper traces, aluminum traces, and any other suitable traces. When each conductor pin is received in a corresponding hole, each conductor may be electronically connected to a trace from the second plurality of traces. Each conductor pin may be electronically connected to a trace from the second plurality of traces via one or more additional conductor pins and traces.

When each conductor pin is received in a corresponding hole, the first segment and the second segment may be electrically connected. When the first segment and the second segment are electrically connected, each trace may be electrically connected to a wire from the plurality of wires. When the first segment and the second segment are electrically connected, electricity may flow from the second segment to the first segment. When the first segment and the second segment are electrically connected, electricity may flow from the plurality of wires, along the second plurality of traces, through the conductor pins and along the first plurality of traces.

The light tape may include a plurality of segments. When each of the plurality of segments are electrically connected, electricity may flow from the plurality of wires to each connected segment. The electricity may flow through along the traces and through the conductor pins and traces included in each connected segment.

The LED may be a first LED. The first LED may have a first color. The LED may have a first correlated color temperature ("CCT"). The first segment may include a second LED. The second LED may have a second color. The second LED may have a second CCT. The first segment may include a third LED. The third LED may include a third color. The third LED may include a third CCT. The first segment may include a fourth LED. The fourth LED may have a fourth color. The fourth LED may have a fourth CCT. The first segment may include a fifth LED. The firth LED may have a fifth color. The fifth LED may have a fifth CCT. The first segment may include any suitable number of LEDs. Each of the LEDs may have any suitable color. Each of the LEDs may have any suitable CCT.

Two or more of the colors may be white. When two or more of the colors are white, the two whites may have different CCTs. One of the whites may be a cool white. One of the whites may be a warm white. One or more of the colors may be red. One or more of the colors may be green. One or more of the colors may be blue. One or more of the colors may be any suitable light color.

Table 1 lists illustrative ranges that may include the first, second third, fourth, fifth and any other suitable CCT values.

TABLE 1

Illustrative ranges that may include the first, second third, fourth, fifth and any other suitable CCT values.

| Illustrative range endpoints (° K) | | | |
|---|---|---|---|
| Lower | Upper | Lower | Upper |
| <1800 | 1800 | 3400 | 3500 |
| 1800 | 1900 | 3500 | 3600 |
| 1900 | 2000 | 3600 | 3700 |
| 2000 | 2100 | 3700 | 3800 |
| 2100 | 2200 | 3800 | 3900 |
| 2200 | 2300 | 3900 | 4000 |
| 2300 | 2400 | 4000 | 4100 |
| 2400 | 2500 | 4100 | 4200 |
| 2500 | 2600 | 4200 | 4300 |
| 2600 | 2700 | 4300 | 4400 |
| 2700 | 2800 | 4400 | 4500 |
| 2800 | 2900 | 4500 | 4600 |
| 2900 | 3000 | 4600 | 4700 |
| 3000 | 3100 | 4700 | 4800 |
| 3100 | 3200 | 4800 | 4900 |
| 3200 | 3300 | 4900 | 5000 |
| 3300 | 3400 | 5000 | >5000 |
| Other suitable lower endpoints | Other suitable upper endpoints | Other suitable lower endpoints | Other suitable upper endpoints |

Two or more of the first LED, second LED, third LED, fourth LED, fifth LED and any other suitable LED may be connected in parallel. Two or more of the first LED, second LED, third LED, fourth LED, fifth LED and any other suitable LED may be connected in series. Two or more of the first LED, second LED, third LED, fourth LED, fifth LED and any other suitable LED may be connected in any suitable combination of parallel and serial connections. The first LED, second LED, third LED, fourth LED, fifth LED and any other suitable LED may not be connected to each other.

The plurality of wires may provide modulated currents to each of the first LED, second LED, third LED, fourth LED, fifth LED and any other suitable LED.

A first wire may provide a negative voltage/current to a cathode of the first LED. A second wire may provide a negative voltage/current to a cathode of the second LED. A third wire may provide a negative voltage/current to a cathode of the third LED. A fourth wire may provide a negative voltage/current to a cathode of the fourth LED. A fifth wire may provide a negative voltage/current to a cathode of the fifth LED.

A sixth wire may provide a positive voltage/current to the light tape. The sixth wire may provide +24 VDC to the light tape. The sixth wire may provide +48 VDC to the light tape. The sixth wire may provide any suitable voltage/current to the light tape. The sixth wire may provide the positive voltage/current to anodes of the first LED, the second LED, the third LED, the fourth LED and the fifth LED.

Any suitable number of wires may provide negative voltage/current to cathodes of the LEDs included in the light tape. Any suitable number of wires may provide positive voltage/current to anodes of the LEDs included in the light tape.

The positive and negative voltage may be a constant voltage. The positive and negative voltage may be a modulated voltage. The positive and negative current may be a constant current. The positive and negative current may be a modulated current.

The positive and negative voltage/current may be provided by a controller. The positive and negative voltage/current may be provided by a power supply. The positive and negative voltage/current may be provided by a transformer. The positive and negative voltage/current may be provided via any suitable power source.

The first wire, the second wire and the third wire may be combined together as a first input into the controller, the power supply or the transformer. The first wire, the second wire and the third wire may be connected in a single casing. The first input may be a negative voltage/current. The first input may be a positive voltage/current. The fourth wire, the fifth wire and the sixth wire may be combined together as a second input into the controller, the power supply or the transformer. The fourth wire, the fifth wire and the sixth wire may be connected in a single casing. The second input may be a positive voltage/current. The second input may be a negative voltage/current. Any of the first, second, third, fourth, fifth, sixth or any other wire may be combined in any suitable combination as any suitable input to the controller, the power supply or the transformer.

The LED may be included a first array of LEDs. The first array of LEDS may be disposed on the first PCB. The first array of LEDs may include two or more LEDs connected in series, parallel or any combination thereof. The first array of LEDs may include any suitable LED control circuitry. LEDs included in the first array of LEDs may include first CCT LEDs and second CCT LEDs. LEDs included in the first array of LEDs may include any suitable CCT as listed in Table 1.

The first PCB may define a recess. The first array of LEDs may be disposed in the recess. The first array of LEDs may be disposed in a single recess. Each LED included in the first array of LEDs may be disposed in an individual recess. The light tape may include a first cover. The first cover may cover the first array of LEDs. The first cover may include phosphor. The phosphor may be formed into a phosphor layer. The phosphor layer may include yellow phosphor. The phosphor layer may include white phosphor. The phosphor layer may include any suitable phosphor. The phosphor layer may be disposed in the recess. The phosphor layer may cover the first array of LEDs. The first cover may include any other suitable materials.

The light tape may include a second cover. The second cover may cover the first PCB. The second cover may include a translucent material. The translucent material may be transparent. The translucent material may be partially opaque. The translucent material may include acrylic. The translucent material may include crystal. The translucent material may include glass. The translucent material may include a polymer. The translucent material may include silicone. The translucent material may include any other suitable material.

The translucent material may be yellow. The translucent material may be white. The translucent material may be clear. The translucent material may be any suitable color.

The second cover may surround the first PCB. The second cover may be waterproof. The second cover may prevent water from damaging the LEDs disposed on the first PCB. The second cover may be an insulator. The second cover may protect the first PCB. The second cover may be flexible. The first PCB may be flexible. The first PCB and the second cover may flex together. The first PCB and the second cover may be bendable and turnable.

The second PCB may define a recess. A second array of LEDs may be disposed in the recess. The second array of LEDs may have one or more features in common with the first array of LEDs. The second array of LEDs may be disposed in a single recess. Each LED included in the second array of LEDs may be disposed in an individual recess. The light tape may include a third cover. The third cover may cover the second array of LEDs. The third cover may include phosphor. The phosphor may be formed into a phosphor layer. The phosphor layer may include yellow phosphor. The phosphor layer may include white phosphor. The phosphor layer may include any suitable phosphor. The phosphor layer may be disposed in the recess. The phosphor layer may cover the second array of LEDs. The third cover may include any other suitable materials.

The light tape may include a fourth cover. The fourth cover may cover the second PCB. The fourth cover may include a translucent material. The translucent material may be transparent. The translucent material may be partially opaque. The translucent material may include acrylic. The translucent material may include crystal. The translucent material may include glass. The translucent material may include a polymer. The translucent material may include silicone. The translucent material may include any other suitable material.

The translucent material may be yellow. The translucent material may be white. The translucent material may be clear. The translucent material may be any suitable color.

The fourth cover may surround the second PCB. The fourth cover may be waterproof. The fourth cover may prevent water from damaging the LEDs disposed on the fourth PCB. The fourth cover may be an insulator. The fourth cover may protect the second PCB. The fourth cover may be flexible. The second PCB may be flexible. The second PCB and the fourth cover may flex together. The second PCB and the fourth cover may be bendable and turnable.

Connection of the first male connector and the second female connector may be a linear connection. Connection of the first female connector and the second male connector may be a linear connection. A linear connection may be a connection that does not require components that extend or rotate in any direction other than the axial direction.

The linear connections may be used in different settings that may include joints and surfaces that are difficult to access. The linear connections may provide low-profile connections that may be used for easy connections in restricted spaces.

Apparatus, methods and systems for providing light are provided.

The apparatus may include one or more sections. Each section may include one or more of an LED, a PCB including a circuit for providing current to the LED light source, a structure for connection to another section, conductors for electrical continuity with another section, optically diffusive material, ornamental material and any other suitable features.

The apparatus may include a first section. The first section may include the first segment. The apparatus may include a second section. The second section may include the second segment. The first section may be connectable to the second section. The first section may include a first pattern of LEDs disposed along a length of the first section. The second section may include a second pattern of LEDs disposed along a length of the second section. The first and second patterns may be the same. The first and second patterns may be different. The first and second sections, when connected, may form a third pattern of LEDs. The connection may cause little or no interruption to the first, second or third patterns.

The connection may include a waterproof connection. The waterproof connection may have an IP rating of IP66. The waterproof connection may have an IP rating higher than IP66. The waterproof connection may have an IP rating lower than IP66. The apparatus may be suitable for indoor use. The apparatus may be suitable for outdoor use. The connection may include an electrical connection. The electrical connection may include a power or communication connection.

The first section may include a first PCB. The first PCB may include a first LED. The first LED may have a first CCT. The first LED may be included in a first string of LEDs having the first CCT. The first string of LEDs may include one or more LEDs. The one or more LEDs may be connected in parallel, in series, or in any combination of serial and parallel connections. The one or more LEDs may be LEDs that are not connected to each other. The first PCB may include a second LED. The second LED may have a second CCT. The first CCT may be different from the second CCT. The second LED may be included in a second string of LEDs having the second CCT. The second string of LEDs may include a one or more LEDs. The one or more LEDs may be connected in parallel, in a series, or in any combination of serial and parallel connections. The one or more LEDs may be LEDs that are not connected to each other.

The first string of LEDs may be connected to the second string of LEDs in parallel. LEDs from the first string of LEDs may be connected to LEDs from the second string of LEDs in a series. LEDs from the first string of LEDs may be independent of LEDs from the second string of LEDs. The first CCT and the second CCT may have any suitable CCT, as listed in Table 1.

LEDs from the first string of LEDs and the second string of LEDs may be disposed on a first side of the first PCB. LEDs from the first string of LEDs and the second string of LEDs may be disposed on a second side of the first PCB. The second side of the first PCB may be different from the first side of the first PCB. The second side may be opposite the first side.

The first PCB may be a single PCB. The first PCB may include LEDs disposed on each of the two sides of the single PCB. The first PCB may include LEDs disposed only on one side of the single PCB. The single PCB may be folded to provide LEDs facing in two different directions. The two different directions may be opposite from each other. The single PCB may be wrapped around so that LEDs may face multiple different directions. The first PCB may include two PCBs. Each of the PCBs may include LEDs disposed on one side. The two PCBs may be attached so that the LEDs are facing in two different directions. The two different directions may be opposite from each other.

The first section may extend in a first direction. LEDs from the first and second strings of LEDs may be disposed on the first side of the first PCB. The LEDs may be disposed in a row. The row may extend along the first direction. The LEDs may be disposed in a one-dimensional array. The LEDs may be disposed in a two-dimensional array. The LEDs may be disposed in a curvilinear array. The LEDs may be disposed in any suitable row, array or position. LEDs from the first second strings of LEDs may be disposed on the second side of the first PCB. The LEDs may be disposed in a row. The row may extend along the first direction. The LEDs may be disposed in a one-dimensional array. The LEDs may be disposed in a two-dimensional array. The LEDs may be disposed in a curvilinear array. The LEDs may be disposed in any suitable row, array or position.

The first side and second side of the first PCB may be covered by a material. The material may be in the form of a bead. The first side of the first PCB may be covered by a first bead of the material disposed on top of the LEDs. The second side of the first PCB may be covered by a second bead of the material disposed on top of the LEDs. The first bead and the second bead may be attached to the first PCB. When the first side is covered with the first bead and the second side is covered with the second bead, the first PCB may be in an arrangement in which the first PCB is not exposed. When the first side is covered with the first bead and the second side is covered with a second bead, the first PCB may be in an arrangement in which part of the first PCB is exposed. The covering may be waterproof. The covering may seal in the first PCB. The covering may enhance the waterproofing of the apparatus.

The first side and the second side of the first PCB may be surrounded by the material. When the first side and the second side of the first PCB are surrounded by the material, the first PCB may be in an arrangement in which the first PCB is not exposed. When the first side and the second side of the first PCB are surrounded by the material, the first PCB may be in an arrangement in which at least part of the first PCB is exposed.

The material may include optically diffusive material. The material may include silicon. The material may include any suitable optically diffusive materials. The material may be yellow. The material may be any suitable color. The material may include translucent material. The translucent material may be transparent.

The first side and second side of the first PCB may be surrounded by a silicone tube. The silicone tube may have an inner diameter of 10-15 mm. The silicone tube may have an outer diameter of 11-20 mm. The silicone tube may have any suitable inner diameter. The first side and the second side may be surrounded by a silicone tube having any suitable outer diameter.

The first section may include a first extension. The first extension may extend along the first direction. The first extension may have a first face. The first extension may have a second face. LEDs from the first and second strings of LEDs may be disposed on the second face of the first extension. The LEDs disposed on the second face may be covered by the material The LEDs disposed on the second face may not be covered by the material. LEDs from the first and second strings of LEDs may be absent from the second face of the first extension. LEDs from the first and second strings of LEDs may be absent from the first face of the first extension. LEDs from the first and second strings of LEDs may be disposed on the first face of the first extension. The first extension may be connected to a first connector. The first connector may be a female connector. The first connector may be a male connector.

The second section may extend along the first direction. The second section may include a second PCB. The second PCB may include one or more features as described in connection with the first PCB. LEDs of the first and second strings of LEDs may be disposed on a first side of the second PCB in a row along the first direction. LEDs of the first and second strings of LEDs may be disposed on a second side of the second PCB in a row along the first direction.

The second section may include a second extension. The second extension may extend along the first direction. The second extension may include a third face. The second extension may include a fourth face. LEDs from the first and second strings of LEDs may be disposed on the fourth face of the second extension. The LEDs disposed on the fourth face may be covered by the material. The LEDs disposed on the fourth face may not be covered by the material. LEDs from the first and second strings of LEDs may be absent from the fourth face of the second extension. LEDs from the first and second strings of LEDs may be absent from the third face of the second extension. LEDs from the first and second strings of LEDs may be disposed on the third face of the second extension. The second extension may be connected to a second connector. The second connector may be a male connector. The second connector may be a female connector.

LEDs disposed along the second face of the first extension may form a continuous row with LEDs disposed on the second section when the first face and the third face are in electrical connection. LEDs disposed on the fourth face of the second extension may form a continuous row with LEDs disposed on the first section when the first face and the third face are in electrical connection.

LEDs disposed along the second face of the first extension may not form a continuous row with LEDs disposed on the second section when the first face and the third face are in electrical connection. LEDs disposed on the fourth face of the second extension may not form a continuous row with LEDs disposed on the first section when the first face and the third face are in electrical connection.

A user may not easily perceive, between the first section and the second section, a discontinuity of illumination when the first section and the second section are connected. A user may easily perceive, between the first section and the second section, a discontinuity of illumination when the first section and the second section are connected.

Electrical connection between the first face and the third face may provide continuous lighting along the first section and second section. Electrical connection between the first face and the third face may not provide continuous lighting along the first and second section. Electrical connection between first face and the third face may emit bidirectional light. Electrical connection between first face and the third face may emit omnidirectional light.

The first and second LED strings may be included in an LED module. The LED module may include a first output pole and a second output pole. The LED module may receive voltage via two wires. The LED module may receive voltage via two or more wires. Voltage may be transmitted to the first and second LED strings via the two or more wires. A first wire may transmit a positive voltage. The positive voltage may be transmitted from the first section to the second section via one or more positive contacts included in the first face and the third face. A second wire may transmit a negative voltage. The negative voltage may be transmitted from the first section to the second section via one or more negative contacts included in the first face and the third face. The first output pole and the second output pole may receive voltage from the two wires. The voltage may be transmitted to the first and second LED strings.

The first section and the second section may emit light. The first section and the second section may emit light having a mixed CCT. The mixed CCT may be user selectable. The mixed CCT may be a mixture of the first CCT and the second CCT. The mixture may include 100% of the first CCT and 0% of the second CCT. The mixture may include 0% of the first CCT and 100% of the second CCT. The mixture may include any suitable percentage of the first CCT and any suitable percentage of the second CCT. The mixed CCT may be any suitable CCT. A user may select between three CCTs. The user may select between 5 CCTs. The user may select between any suitable number of CCTs. The user may select from a continuous range of mixed CCTs between the first CCT and the second CCT. The user select from a continuous range of mixed CCTs between the first CCT and the second CCT including the first CCT and the second CCT.

The apparatus may include a controller. The controller may include a microcontroller. The controller may include any suitable controller. The controller may include a user-operable CCT selector. The user-operable CCT selector may have two or more settings. The two or more settings may correspond to different outputs at the first output pole and the second output pole. User-operable CCT selector may be mechanically operable. The user-operable CCT selector may be electronically operable. The user-operable CCT selector may be electronically operable using a software. The user-operable CCT selector may be electronically operable using a software application. The user-operable CCT selector may be wirelessly operable.

When the user-operable CCT selector is in a first position, the controller may control the first output pole to be a positive output pole and the second output pole to be a negative output pole. When the first output pole is a positive output pole and the second output pole is a negative output pole, LEDs from the first string of LEDs may be ON and LEDs from the second string of LEDs may be OFF. At this time, the CCT of the light emitted may be the first CCT.

When the user-operable CCT selector is in a second position, the controller may control the first output pole to be a negative output pole and the second output pole to be a positive output pole. When the first output pole is a negative output pole and the second output pole is a positive output pole, LEDs from the first string of LEDs may be OFF and LEDs from the second string of LEDs may be ON. At this time, the CCT of the light emitted may be the second CCT.

When the user-operable CCT selector is in a third position the controller may control the first output pole a first fraction of the time to be a positive output pole and a second fraction of time to be a negative output pole. The second output pole may have a polarity opposite that of the first output pole. When the positive and negative frequency is large enough, the CCT of the first and section may be a mixture of the first and second CCT. The mixed CCT may be a CCT value included in the range listed in Table 1.

The first position may correspond to the first CCT. The second position may correspond to the second CCT. The third position may correspond to any suitable mixing of the first and second CCT. The third position may include any suitable number of positions. Each of the positions may correspond to a CCT mixture. The positions may be programmable by a user. The positions may be selectable by a user. The positions may be continuous. The positions may be included in a slider. The positions may be analog positions. The positions may be digital positions.

A switching cycle, during which the first string of LEDs are illuminated for a first fraction of time and the second string of LEDs are illuminated for a second fraction of time may have any suitable duration.

The first and second fractions may be the same. The first and second fractions may be different. A sum of the first fraction and the second fraction may be about 1. The first fraction and the second fraction may be sized to result in a desired CCT mix between the first CCT and the second CCT. Table 2 lists illustrative ranges that may include the first and second fractions.

TABLE 2

Ranges that may include the first and second fractions. Illustrative range endpoints

| Lower | Upper | Lower | Upper |
|---|---|---|---|
| <0.05 | 0.05 | 0.50 | 0.55 |
| 0.05 | 0.10 | 0.55 | 0.60 |
| 0.10 | 0.15 | 0.60 | 0.65 |
| 0.15 | 0.20 | 0.65 | 0.70 |
| 0.20 | 0.25 | 0.70 | 0.75 |
| 0.25 | 0.30 | 0.75 | 0.80 |
| 0.30 | 0.35 | 0.80 | 0.85 |
| 0.35 | 0.40 | 0.85 | 0.90 |
| 0.40 | 0.45 | 0.90 | 0.95 |
| 0.45 | 0.50 | 0.95 | >0.95 |
| Other suitable lower endpoints | Other suitable upper endpoints | Other suitable lower endpoints | Other suitable upper endpoints |

The apparatus may include any suitable number of sections. Each section may include a first extension and a second extension. Each section may connect to a second section using the first extension and to a third section using the second extension. The first extension of the section may connect to a second extension of the second section and a first extension of the second section may connect to a second extension of the third section.

The sections may be flexible. The sections may be bendable. The sections may be twistable. The sections may be rigid. The sections may have any suitable flexibility.

The sections may be configured to be insertable into a fixture. The fixture may be a tubular fixture. The fixture may be any suitable fixture.

The first and second extensions may be removeable. The first and second extensions may be insertable into ends of any suitable section. The first and second extensions may be irremovable.

The first section may include electrical contacts. The electrical contacts may include conductors. The electrical contacts may include one or more positive electrical contacts. The electrical contacts may include one or more negative electrical contacts. The electrical contacts may include traces, conducting pins, mounting pads, or any other suitable electrical contacts.

The second section may include electrical contacts. The electrical contacts may include conductors. The electrical contacts may include one or more positive electrical contacts. The electrical contacts may include one or more negative electrical contacts.

The first section may include the first or the second connector at a first end of the first section. The second section may include the first or the second connector at a first end of the second section. The first connector may interlock with the second connector to connect the first section to the second section. The apparatus may include an adapter. The adapter may connect one first connector on one section to a different first connector on a different section. The adapter may connect one second connector on one section to a different second connector on a different section.

The first and second connectors may include a thickness. The thickness may be a fraction of a thickness of the first and second sections. The fraction may be between 0.5 and 1.5. The fraction may be any suitable fraction. The first and second connectors may include a width. The width may be a fraction of a width of the first and second sections. The fraction may be between 0.5 and 1.5. The fraction may be any suitable fraction.

The connectors may surround an end of the respective sections. The connectors may be integral with the end of the respective sections. The connectors may be sealed to the end of the respective sections. The connectors may be sealed to the respective sections via an adhesive, by crimping or any other suitable mechanical means. The connectors may be releasably connected to the respective sections. The connectors may be releasably connected via clips or any other suitable mechanical means. The connectors may be releasably connected to the first and second extensions of the first and second sections respectively.

The first connector may include a first length. The second connector may include a second length. The first and second lengths may be sized such that there is little or no interruption to the pattern of LEDs from the first and second sections. A total length of the first and second connectors, when connected, may be any suitable length. The total length may be in the range of 0.1 inches through 12 inches. For example, the total length may be 1.25 inches, 1.5 inches, 1.75 inches, 2 inches, 2.25 inches or any suitable number of inches.

The connectors may be cylindrical, cuboid or any other suitable shape. The connectors may be a flat cuboid shape. The flat cuboid shape may allow the connectors to lie flat against a surface. Lying flat against the surface may prevent interruptions to the pattern of LEDs in an up-down direction.

The connectors may include ridges on sides thereof. The ridges may increase the gripping surface area. The connectors may be made of a pliable material. The connectors may include plastic or any other suitable material. The connectors may be transparent. The connectors may be translucent. The connectors may be opaque. The connector may be any suitable color.

Integrating the connectors into the respective sections may enhance the waterproof connection. Sealing the connectors around the respective sections may enhance the waterproof connection.

The first and second connector may include locking features. The first connector may include one or more tongues. The first connector may include 1, 2, 3, 4 or any suitable number of tongues. The first connector may include a first tongue and a second tongue. The first tongue may include the first tang. The second tongue may include the second tang. The first tongue may be shorter than the second tongue. The second tongue may be wider than the first tongue. The second tongue may be thicker than the first tongue. The first tongue may extend from a first side of an end of the first connector. The second tongue may extend from a second side, opposite the first side, of the end of the first connector. The tongues may be T-shaped. The tongues may include a stem. The tongues may include a head. The sides of the head may taper in a direction away from the stem. The sides of the head may include tabs.

The first connector may include a female electrical contact. The female electrical contact may include a plug with one or more holes at a first end of the female electrical contact. There may be 1, 2, 3, 4, 5, 6 or any suitable number of holes. The holes may include an electrical connection to the first section. The electrical connection may run from the first end of the female electrical contact to a second end opposite the first end of the female electrical contact. The female electrical contact may engage the electrical contact of the first section. The electrical contact of the first section may include pins, wires or any other suitable electrically conductive surfaces. The pins, wires or any other suitable electrically conductive surfaces may map to contacts of the female electrical contact.

The second connector may include one or more grooves (in the context of locking features, as distinct from grooves pertaining to sealing features, a "cutout"). The one or more grooves may include cutouts. The number of grooves may correspond to the number of tongues on the first connector. The size and shape of the grooves may correspond to the respective tongues on the first connector. The grooves may include a protrusion on either side of an opening of the groove. The protrusions may include a gap between them. The gap may be slightly smaller than a longest width of the respective tongue on the first connector. The protrusions may be tapered. The tapers on the protrusions may align with the taper on the sides of the tongue. The head of the tongue may be wider than the protrusions. The width of the head of the tongue and protrusions may cause the tongue to resist being withdrawn from the groove in an axial direction once the tongue is inserted into the groove.

Pushing the tongue into its corresponding groove may cause one or more of the head of the tongue and the protrusion to compress until the head of the tongue moves past the protrusion. The compressed portions may return to their resting state when the head of the tongue moves past the protrusion. A popping sound may be created when the compressed portions return to their resting state. The popping sound may provide auditory feedback that the first and second connectors are connected. The return of the compressed portions to their resting state may provide tactile feedback that the first and second connectors are connected.

The first and second sections may be separated after being connected. The first and second sections may be separated by withdrawing the tongues from the grooves. The tongues may be withdrawn from the grooves in the axial direction with a sufficient force. The end of the groove opposite the protrusions may taper. The taper at the end of the groove may start on a plane perpendicular to the starting plane of the taper of the protrusions. The taper at the end of the groove may allow a tool or finger to pull the tongue away from the second connector. When the tongues are pulled above the protrusions the tongues may be withdrawn in the axial direction from the second connector, thereby separating the first and second connectors. The tongues may include a stiffness. The stiffness may be selected such that the tongues will not deform or break while separating the first and second connectors.

A connection between one of the first and second sections and one of the first and second connectors may include a first strength. The connection between the first connector and the second connector may include a second strength. The first strength may be greater than the second strength. The connection between one of the first and second sections and one of the first and second connectors may pass a strain release test. The strain release test may test that the first strength is higher than a stress threshold by a predetermined amount. The stress threshold may correspond to the second strength. Pulling on the first section in the axial direction to separate the first section from the second section may cause the first section to separate from the first connector.

The first and second connectors may each include a strain relief device. The strain relief device may be disposed inside the respective connector. The strain relief device may bite into the respective section when attached to the respective connector. The strain relief device may relieve stress from the electrical connection when pulling on the respective section.

The second connector may include a male electrical contact. The male electrical contact may include an elongated portion. The male electrical contact may include one or more conductor pins disposed within the elongated portion. The number of conductor pins may correspond to the number of holes in the female electrical contact of the first connector. The size and shape of the conductor pins may correspond to the size and shape of the holes. The conductor pins may fit into the holes when the first connector is connected to the second connector. The conductor pins may engage the electrical connection of the first connector. The conductor pins may be disposed on a first end of the elongated portion. The conductor pins may engage the electrical contact of the second section at a second end opposite the first end of the elongated portion. The conductor pins may engage the electrical contact of the second section within the middle of the elongated portion. The electrical contact of the second section may include pins, wires or any other suitable conductive surfaces. The pins, wires or any other suitable conductive surfaces may map to the conductor pins disposed in the second connector. The elongated portion may include an indentation along its outer surface. The indentation may include a groove. The indentation may be transverse to a longitudinal length of the second connector. The indentation may extend entirely around the outer surface of the elongated portion. There may be 1, 2, 3, 4, 5 or any suitable number of indentations. The indentations may be arranged in a stepped manner.

O-rings may be positioned within the indentations. O-rings may include sealing rings. The number of O-rings may correspond to the number of indentations. The O-rings may be silicone, rubber or any suitable material. The O-rings may be positioned within the indentations. The O-rings may be sized and shaped to fit within the indentations and slightly protrude away from the elongated portion. The small protrusion may contact an inner portion of the first connector when the first and second connectors are connected. Contact of the small protrusions with the inner portion of the first connector may prevent water or dirt from crossing the O-ring into the first connector. Contact of the small protrusions with the inner portion of the first connector may prevent water or dirt from crossing the O-ring and gaining access to the second connector. Contact of the small protrusions with the inner portion of the first connector may provide the waterproof connection. Contact of the small protrusions with the inner portion of the first connector may enhance the waterproof connection. The stepped manner arrangement of the O-rings and indentations may allow for a more effective waterproofing.

The waterproof connection may include one or more of the sealing of the first and second PCBs, the sealing of the connectors to the respective sections and the seal between the connectors.

The first extension may be sealed within the first connector. The first extension may be sealed within the second connector. Before sealing the first extension to the first connector, the positive and negative electrical contacts may be connected to the electrical connection of the first connector via soldering. Before sealing the first extension to the second connector, the positive and negative electrical contacts may be connected to the conductor pins via soldering. Sealing the first extension within the first or second connectors may be effected without soldering. A mechanical connection between the first extension and the respective connector may be strong enough, when placed correctly, to maintain the positive and negative electrical contacts in contact with the electrical connection of the respective connector. The illustrative apparatus may include any other suitable connections between electrical contacts.

The second extension may be sealed within the first connector. The second extension may be sealed within the second connector. Before sealing the second extension to the first connector, the positive and negative electrical contacts may be connected to the electrical connection of the first connector via soldering. Before sealing the second extension to the second connector the positive and negative electrical contacts may be connected to the conductor pins via soldering. Sealing the second extension within the first or second connectors may be effected without soldering. A mechanical connection between the first extension and the respective connector may be strong enough, when placed correctly, to maintain the positive and negative electrical contacts in contact with the respective connector. The illustrative apparatus may include any other suitable connections between electrical contacts.

Figure 3:
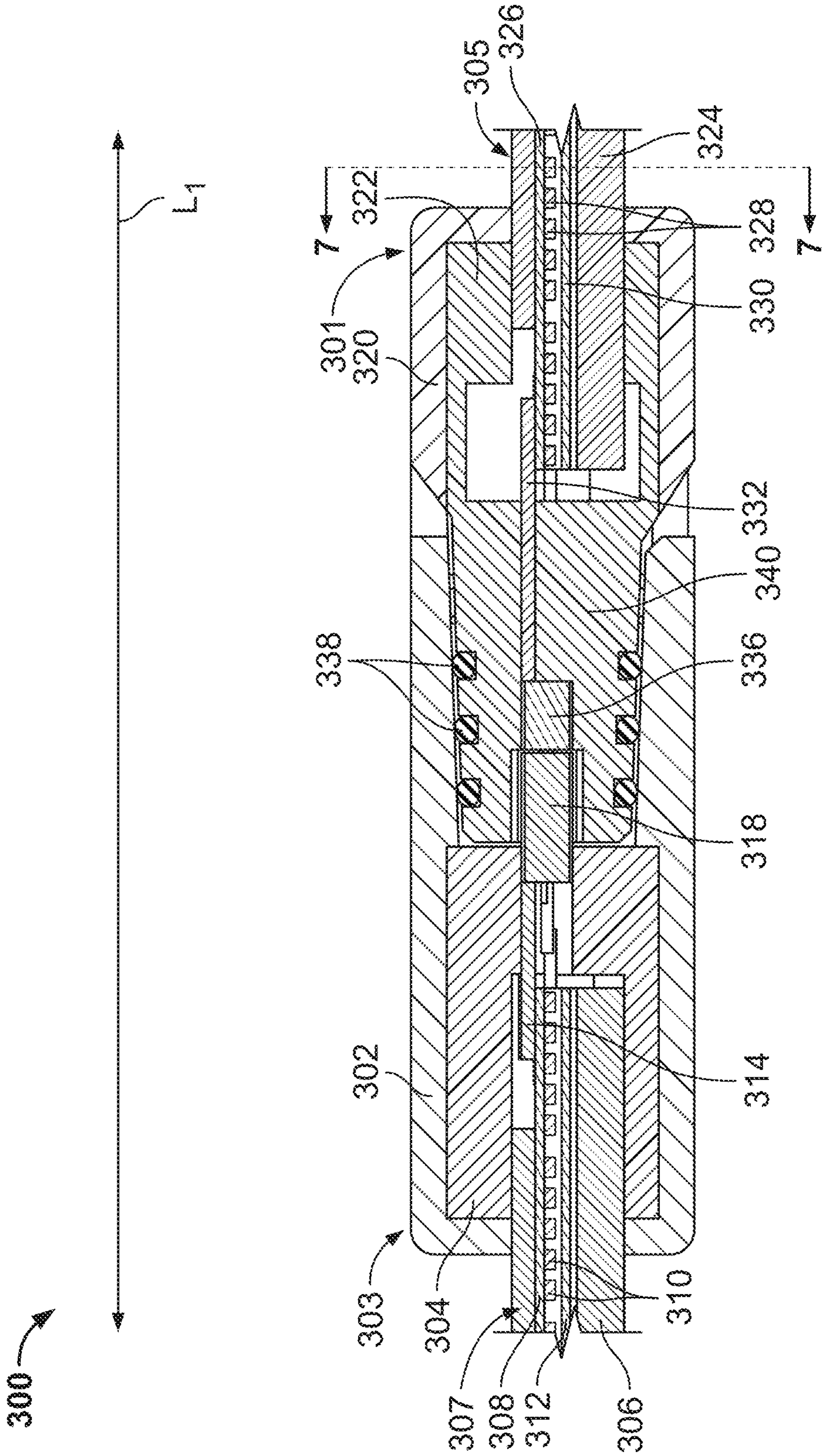
FIG. 3 shows illustrative apparatus in accordance with the principles of the invention.
Figure 17:
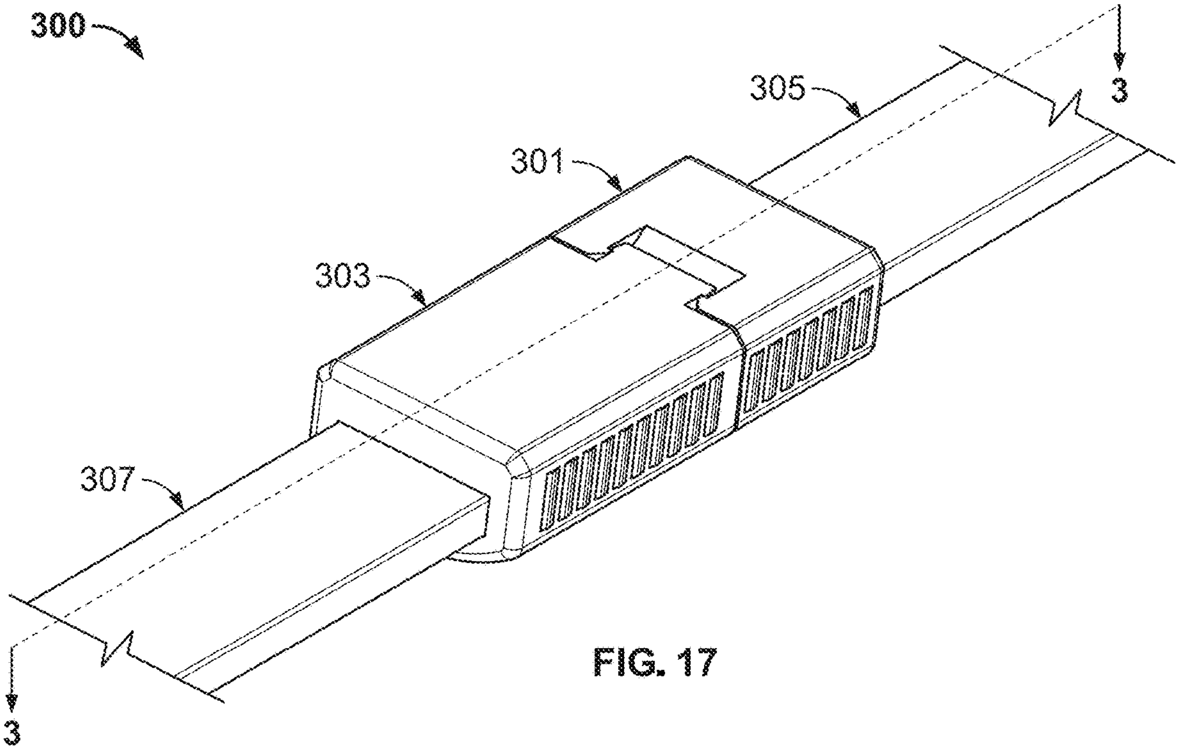
FIG. 17 shows schematically illustrative apparatus in accordance with the principles of the invention.

FIG. 3 shows a cross-sectional view of illustrative connector 300 similar to the cross-sectional view taken along view lines 3-3 in FIG. 17.

Connector 300 may include male connector 301. Male connector 301 may include casing 320. Male connector 301 may include holder 322. Holder 322 may include extension 340. Extension 340 may extend from casing 320. Extension 340 may extend along longitudinal axis $L_1$. Extension 340 may be tapered. Extension 340 may define grooves. The grooves may seat sealing rings 338. Male connector 301 may include shelf 332. Male connector 301 may include conductor pin holder 336.

Male connector 301 may be connected to first segment 305. First segment 305 may include PCB 326. First segment 305 may include LEDs 328. LEDs 328 may be disposed on PCB 326. LEDs 328 may include LEDs and any suitable LED circuitry. PCB 326 may include cover 330. Cover 330 may be disposed on PCB 326. Cover 330 may cover LEDs 328. First segment 305 may include cover 324. Cover 324 may be disposed around PCB 326. Cover 324 may cover PCB 326. Cover 324 may cover PCB 326 and cover 330.

Cover 324 may be a cover that does not cover all of PCB 326. Part of PCB 326 may be exposed. Shelf 332 may be connected to the part of PCB 326 that is exposed. Connection of shelf 332 to the part of PCB 326 that is exposed may enable electrical connection between conductor pins included in conductor pin holder 336 and PCB 326. Holder 322 may be connected to cover 324. The part of PCB 326 that is exposed may be surrounded by holder 322. Connection of holder 322 to cover 324 may mechanically connect male connector 301 to first segment 305. Casing 320 may be connected to holder 322. Casing 320 may be connected to cover 324. Connection of casing 320 to cover 324 may mechanically connect male connect connector 301 to first segment 305.

Connector 300 may include female connector 303. Female connector 303 may include casing 302. Female connector 303 may include holder 304. Casing 302 may include an end. The end may extend beyond holder 304. Inside edges of the end may be tapered. The end may receive extension 340. The taper of the inside edges of the end of casing 302 may correspond to the taper of extension 340. Female connector 303 may include shelf 314. Female connector 303 may include conductor pin receptacle 318.

Female connector 303 may be connected to second segment 307. Second segment 307 may include PCB 308. Second segment 307 may include LEDs 310. LEDs 310 may include LEDs and any suitable LED circuitry. LEDs 310 may be disposed on PCB 308. PCB 308 may include cover 312. Cover 312 may be disposed on PCB 308. Cover 312 may cover LEDs 310. Second segment 307 may include cover 306. Cover 306 may be disposed around PCB 308. Cover 306 may cover PCB 308. Cover 306 may cover PCB 308 and cover 312.

Cover 306 may be a cover that does not cover all of PCB 308. Part of PCB 308 may be exposed. Shelf 314 may be connected to the part of PCB 308 that is. Connection of shelf 314 to the part of PCB 308 that is exposed may enable electrical connection between conductor pins included in conductor pin holder 336 and PCB 308 when first segment 305 is connected to second segment 307. Holder 304 may be connected to cover 306. The part of PCB 308 that is exposed may be surrounded by holder 304. Connection of holder 304 to cover 306 may mechanically connect female connector 303 to second segment 307. Casing 302 may be connected to holder 304. Casing 302 may be connected to cover 306. Connection of casing 302 to cover 306 may mechanically connect female connector 303 to second segment 307.

When male connector 301 is interlocked with female connector 303, first segment 305 may be connected to second segment 307. When male connector 301 is interlocked with female connector 303, casing 302 may receive extension 340. When casing 302 receives extension 340, first segment 305 may be mechanically connected to second segment 307. When male connector 301 is interlocked with female connector 303, conductor pins included in conductor pin holder 336 may be received by corresponding holes included in conductor pin receptacle 318. When pins included in conductor pin holder 336 may be received by corresponding holes included in conductor pin receptacle 318, first segment 305 may be electrically connected to second segment 307. When male connector 301 is interlocked with female connector 303, first segment 305 may be mechanically and electrically connected to second segment 307.

Figure 4:
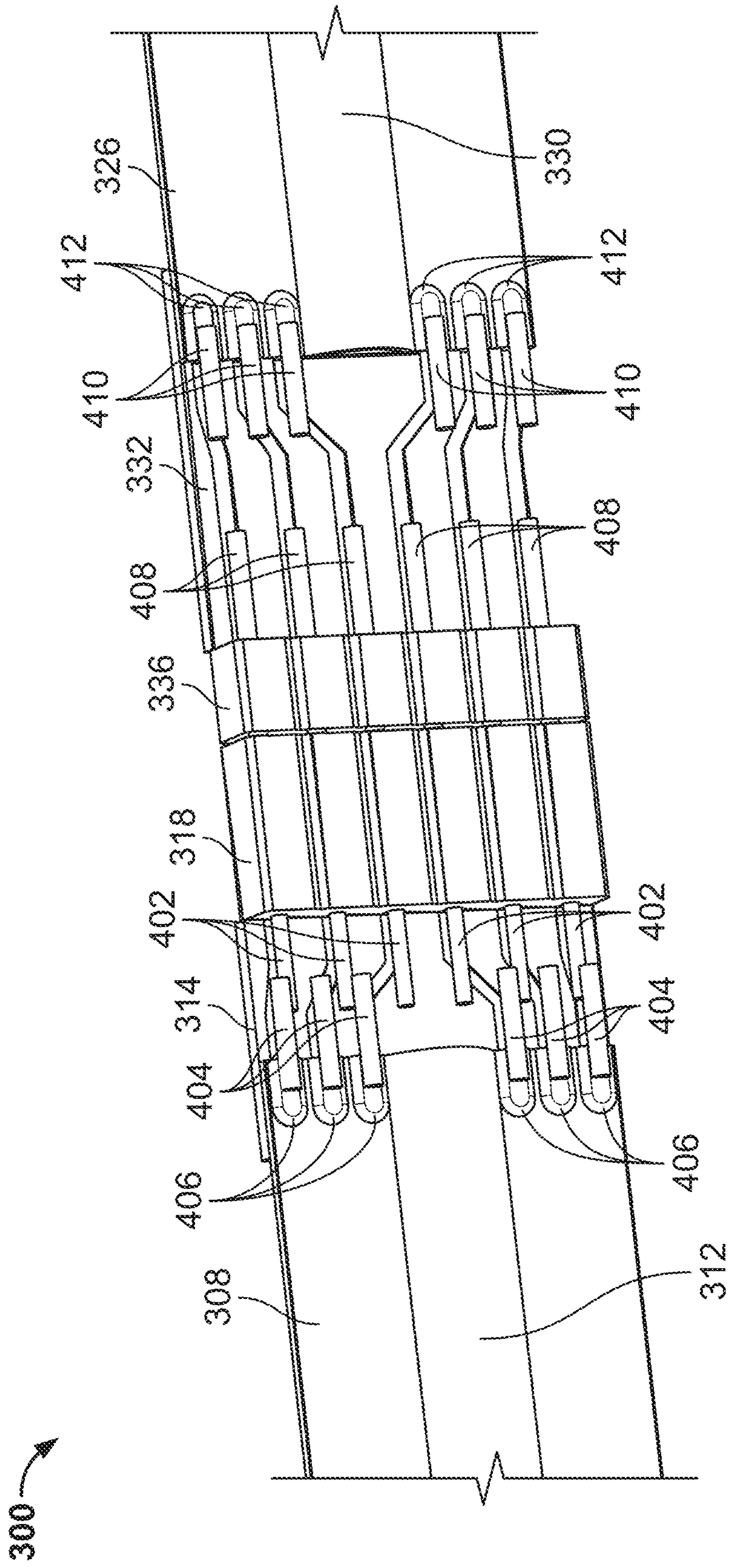
FIG. 4 shows schematically illustrative apparatus in accordance with the principles of the invention.

FIG. 4 shows a bottom view of the illustrative electrical connections included in connector 300.

PCB 326 may include one or more traces (not shown). PCB 326 may include pads 412. Pads 412 may be surface mounting pads. Conductor pins 410 may extend from extension 340 (shown in FIG. 1). Conductor pins 410 may contact pads 412. Pads 412 may be a connection point between conductor pins 410 and the traces included in PCB 326.

Extension 340 may include traces. Conductor pins 410 may connect to traces included in extension 340 (not shown). Conductor pin holder 336 may include conductor pins 408.

Conductor pins 408 may extend towards conductor pins 410. Conductor pins 408 may connect to the traces included in extension 340 (not shown). The traces included in extension 340 may provide electrical continuity between conductor pins 408 and conductor pins 410. Electricity may be transmitted from conductor pins 410 to traces included in PCB 326 via pads 412. Electricity may be provided to LEDs 328 through the traces included in PCB 326.

PCB 308 may include one or more traces (not shown). PCB 308 may include pads 406. Pads 406 may be surface mounted pads. Conductor pins 404 may be connected to pads 406. Pads 406 may be a connection point between conductor pins 404 and the traces included in PCB 308.

Conductor pins 404 may contact conductor pins 402. Conductor pins 402 may extend from conductor pin receptacle 318. Conductor pins 402 may extend towards conductor pins 402. Conductor pin receptacle 318 may include conductive material. When conductor pin receptacle 318 receives conductor pins extending from conductor pin holder 336 (not shown), electricity may be transmitted from the conductor pins to conductor pins 402 via the conductive material. Electricity may be transmitted from conductor pins 402 to conductor pins 404. Electricity may be transmitted from conductor pins 404 to traces included in PCB 308 via pads 406. Electricity may be provided to LEDs 310 through the traces included in PCB 308.

Figure 5:
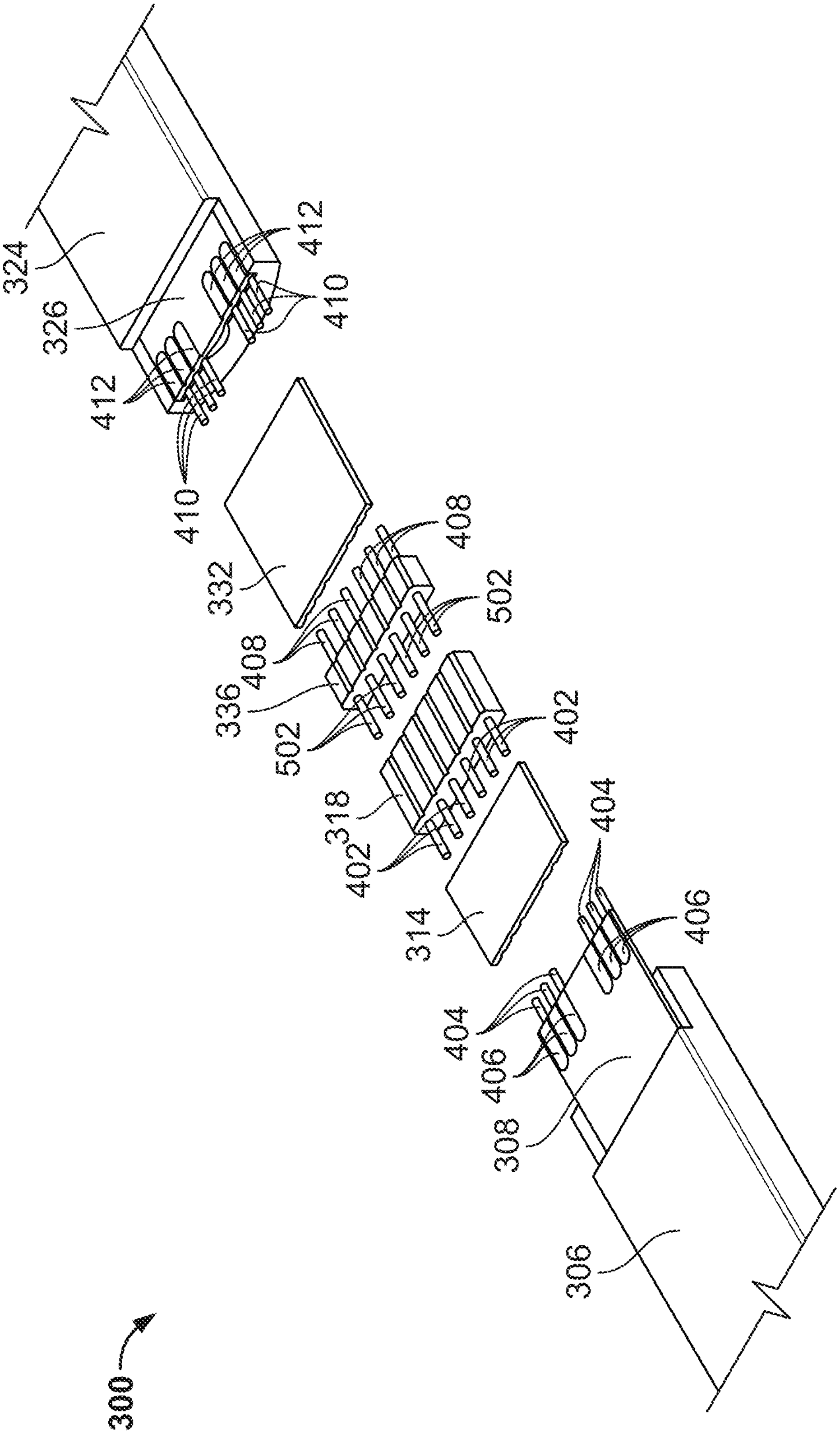
FIG. 5 shows schematically illustrative apparatus in accordance with the principles of the invention.

FIG. 5 shows a top, partially exploded view, of the electrical connections included in connector 300.

Conductor pins 502 may extend from conductor pin holder 336. Conductor pins 502 may extend from conductor pin holder 336 in a direction opposite the direction that conductor pins 408 extend. Conductor pins 502 may be received by holes defined by conductor pin receptacle 318. When conductor pins 502 are received by holes defined by conductor pin receptacle 318, electrical connectivity may be provided between PCB 326 and PCB 308.

Figure 6:
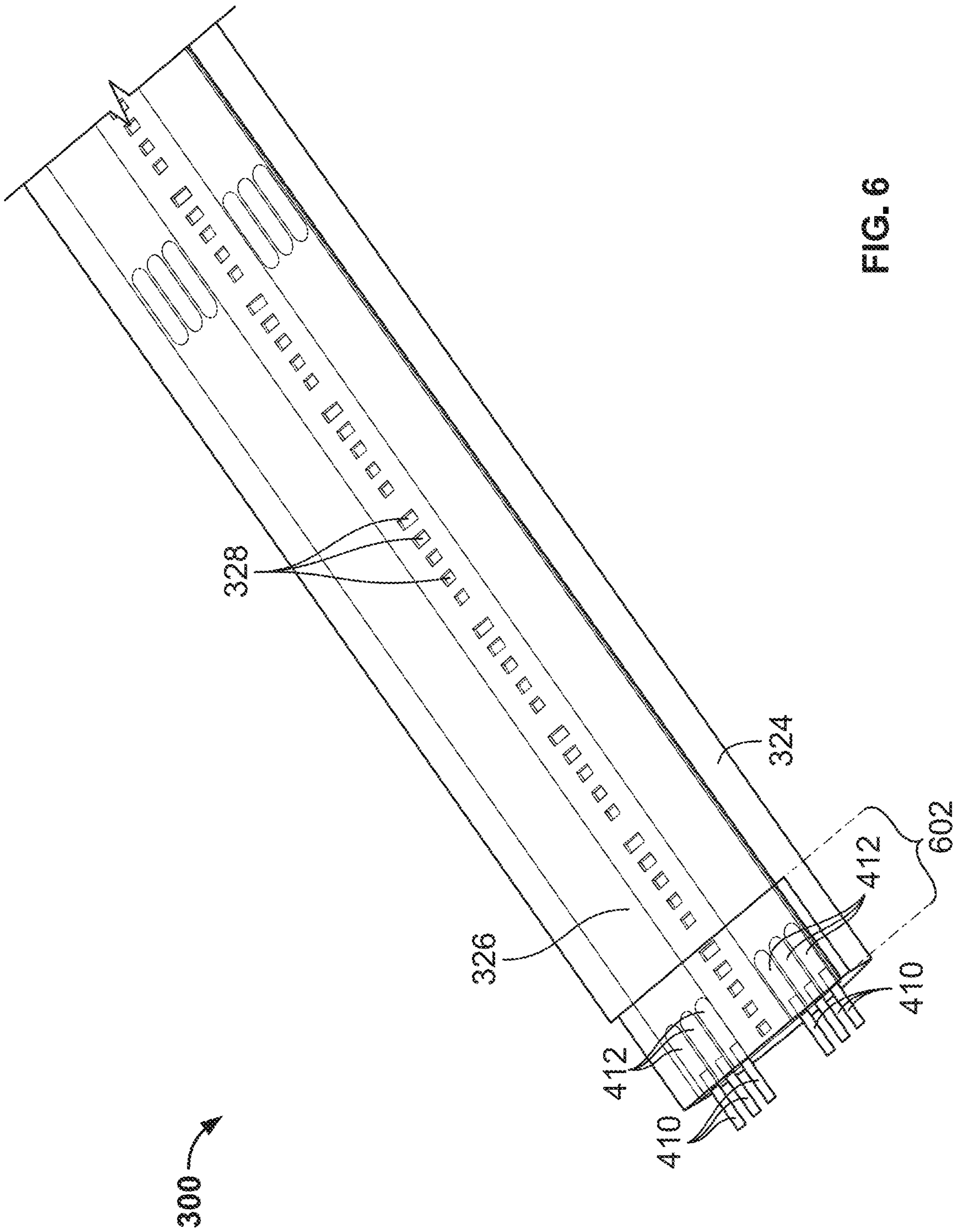
FIG. 6 shows schematically illustrative apparatus in accordance with the principles of the invention.

FIG. 6 shows a top view of PCB 326. Segment 602 of PCB 326 may be exposed. Cover 324 may not cover segment 602. Because segment 602 is exposed, conductor pins 410 may be connected to pads 412. Pads 412 may be included in segment 602.

Figure 7:
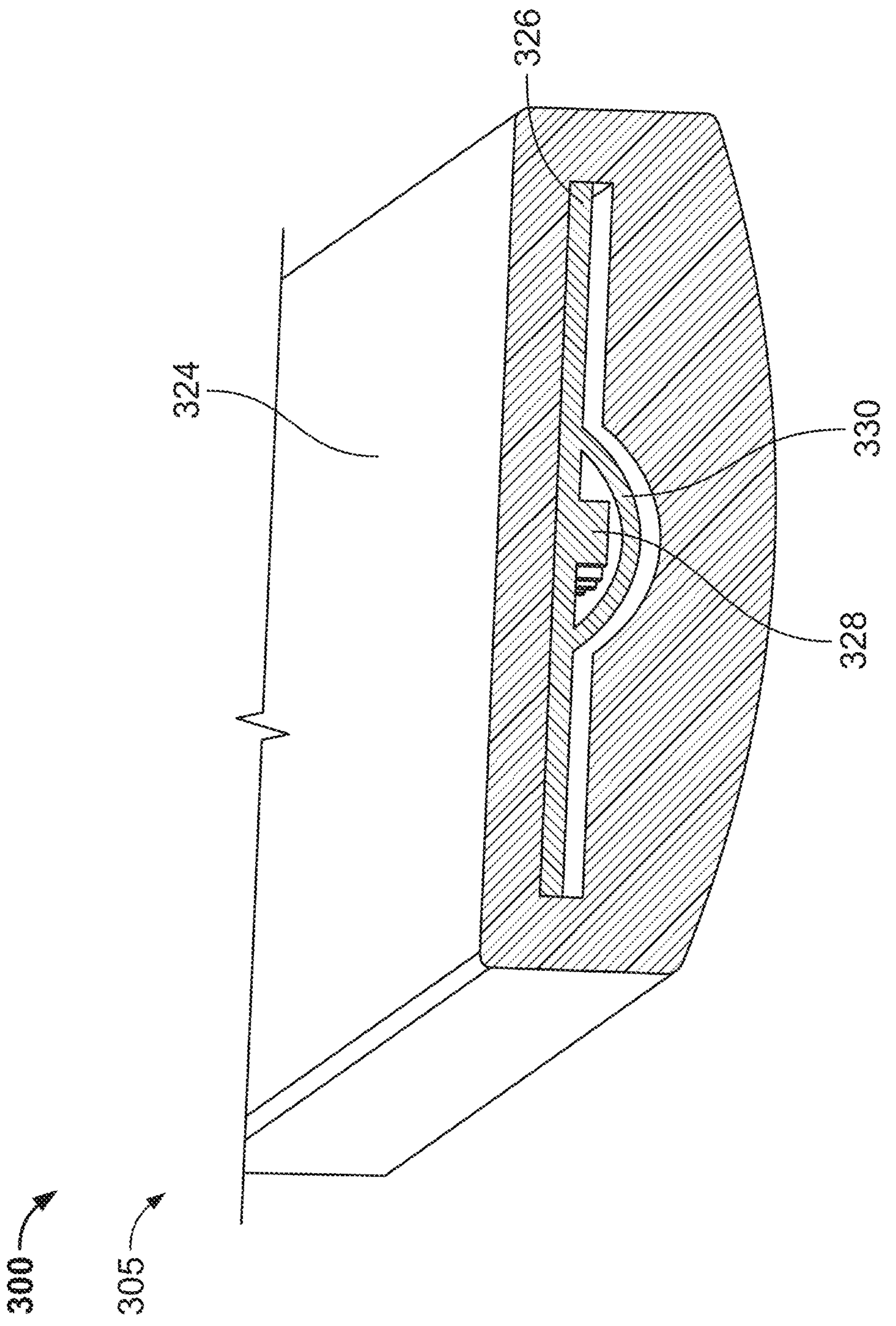
FIG. 7 shows schematically illustrative apparatus in accordance with the principles of the invention.

FIG. 7 shows a cross-sectional view of first segment 305 similar to the cross-sectional view taken along view lines 7-7 in FIG. 3 with background elements removed and subject matter that has been excluded by the cross-sectional view in FIG. 3 included.

Figure 8:
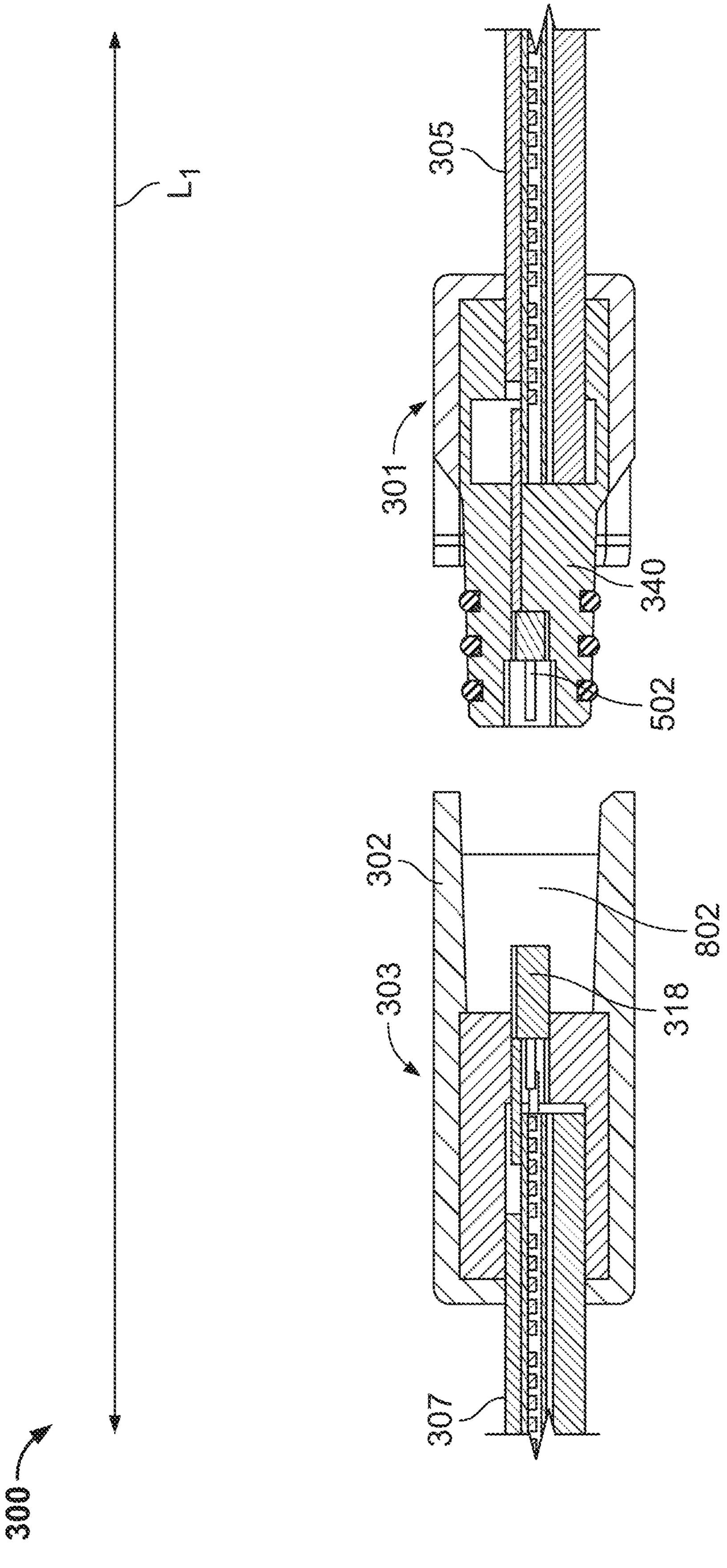
FIG. 8 shows schematically illustrative apparatus in accordance with the principles of the invention.
Figure 10:
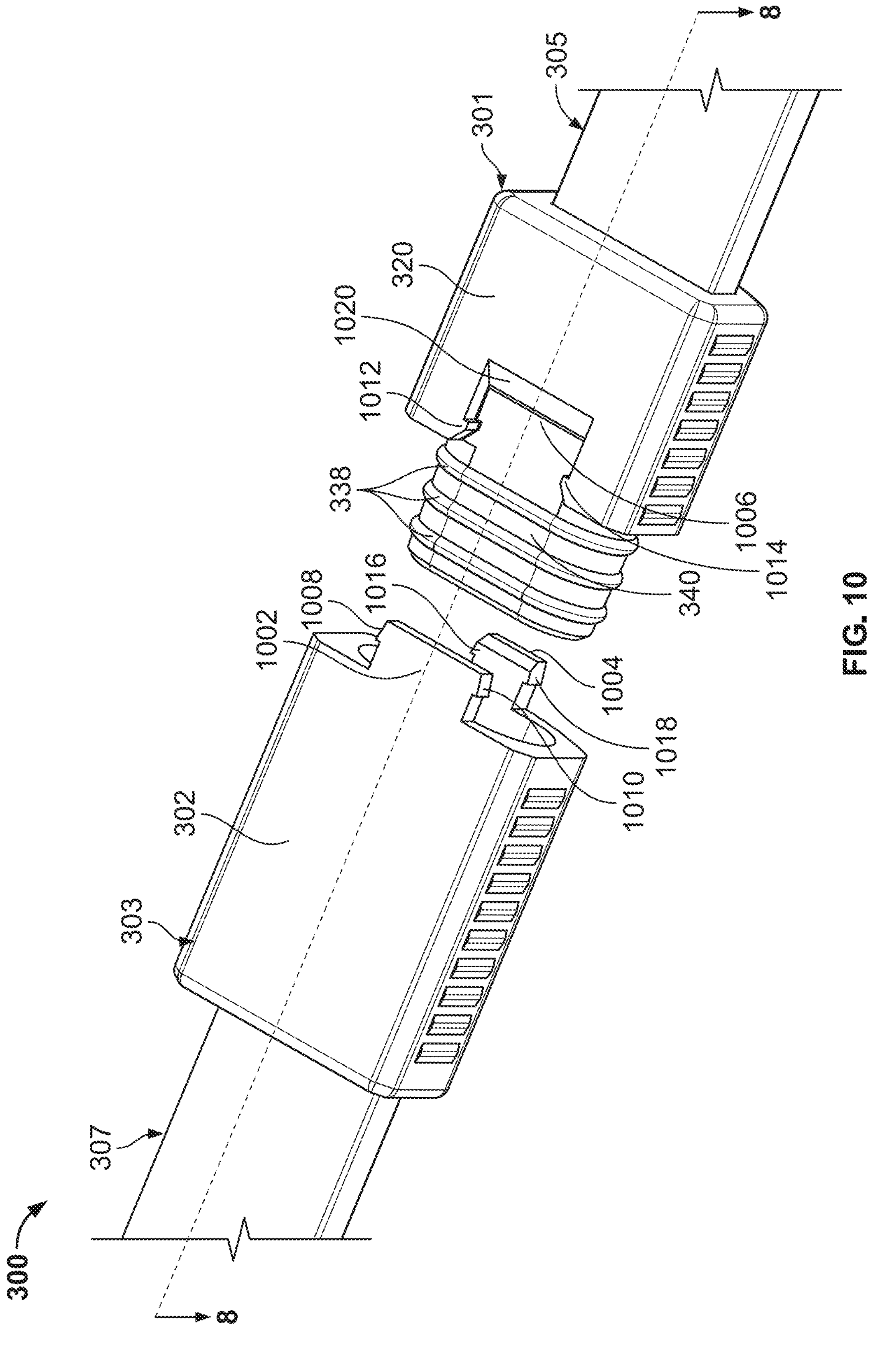
FIG. 10 shows schematically illustrative apparatus in accordance with the principles of the invention.

FIG. 8 shows a cross-sectional view of connector 300 similar to the cross-sectional view taken along lines 8-8 in FIG. 10. FIG. 8 shows the cross-sectional view of connector 300 when first segment 305 is not mechanically or electrically connected to second segment 307.

Casing 302 may define receptacle 802. Receptacle 802 may receive extension 340. When receptacle 802 receives extension 340, sealing rings 338 may contact an inner wall of receptacle 802. Sealing rings 338 may seal any gaps formed when receptacle 802 receives extension 340. Sealing rings 338 may prevent water and other particles from entering into connector 300. Sealing rings 338 may enable a snug fit between male connector 301 and female connector 303 when male connector 301 is interlocked with female connector 303.

Figure 9:
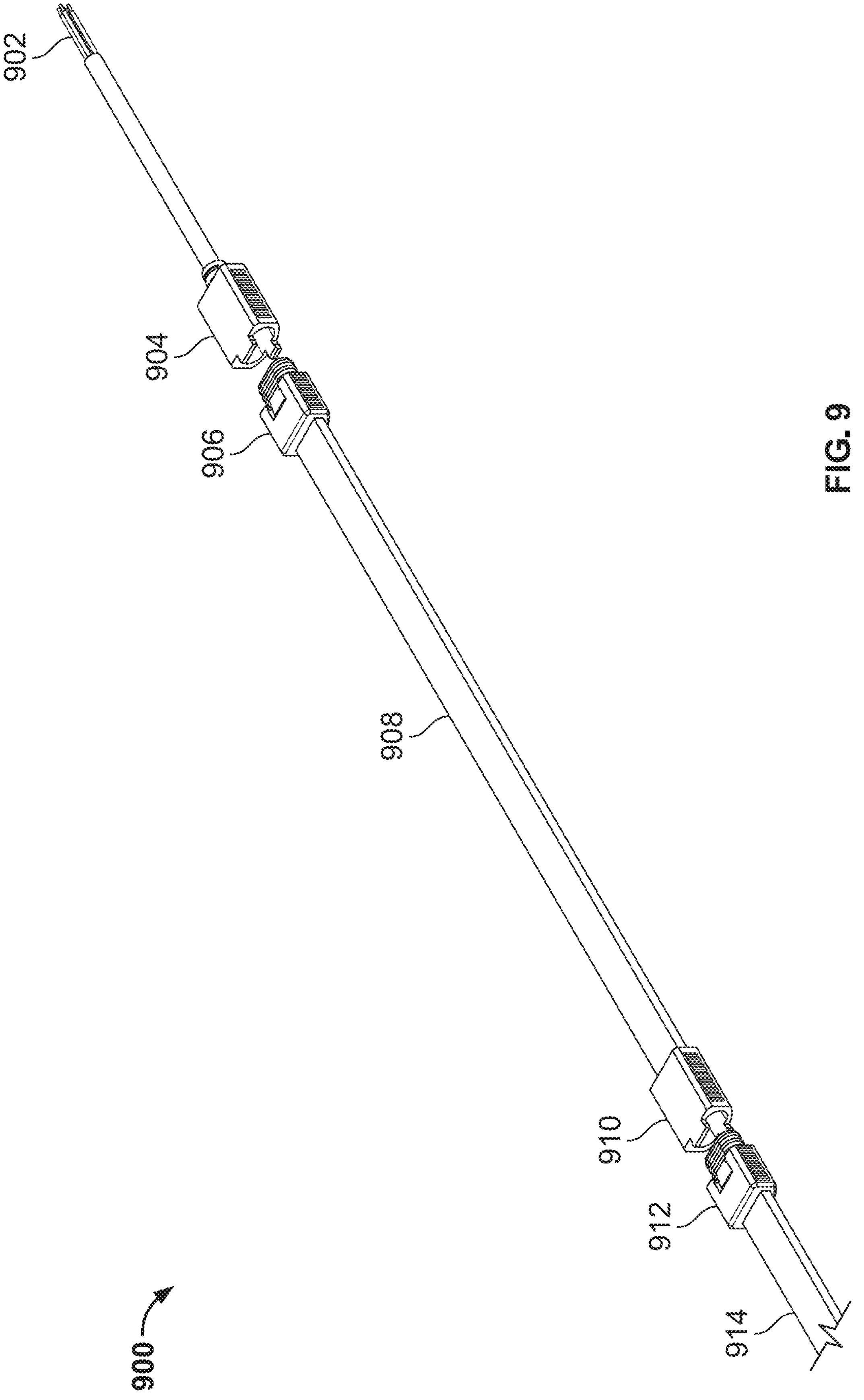
FIG. 9 shows schematically illustrative apparatus in accordance with the principles of the invention.

FIG. 9 shows illustrative light tape 900.

Light tape 900 may have one or more features in common with connector 300.

Light tape 900 may include wires 902 Wires 902 may provide voltage, current, lighting information and any other suitable lighting data to LEDs included in light tape 900. Wires 902 may be connected to connector 904.

Connector 904 may interlock with connector 906. Connector 906 may be connected to segment 908. Connector 906 may be connected to segment 908 at a first end. Connector 910 may be connected to segment 908. Connector 910 may be connected to segment 908 at a second end. Connector 910 may interlock with connector 912. Connector 912 may be connected to segment 914.

When connector 904 is interlocked with connector 906, current, voltage lighting information and any other suitable lighting data may be transmitted from wires 902 to segment 908. When connector 910 is interlocked with connector 912, current, voltage lighting information and any other suitable lighting data may be transmitted from segment 908 to segment 914. When connector 904 is interlocked with connector 906 and connector 910 is interlocked with connector 912, current, voltage lighting information and any other suitable lighting data may be transmitted from wires 902 to segment 908 and segment 914.

FIG. 10 shows a top view of connector 300.

Casing 302 may include tang 1002. Casing 320 may include cutout 1006. Cutout 1006 may include bevel 1020. When male connector 301 is interlocked with female connector 303, tang 1002 may be received by cutout 1006. Bevel 1020 may be shaped to receive tang 1002. Cutout 1006 may include ledge 1012. Cutout 1006 may include ledge 1014. Tang 1002 may include tab 1008. Tang 1002 may include tab 1010. Tabs 1008 and 1010 may extend from tang 1002.

When female connector 303 is being pushed into male connector 301, ledges 1012 and 1014 may deform around tabs 1008 and 1010. Ledges 1012 and 1014 may deform around tabs 1008 and 1010 so that cutout 1006 can receive tang 1002. When cutout 1006 receives tang 1002, ledge 1012 may engage tab 1008. When cutout 1006 receives tang 1002, ledge 1014 may engage tab 1010. When ledge 1012 engages tab 1008 and ledge 1014 engages tab 1010, male connector 301 may be interlocked with female connector 303. When ledge 1012 engages tab 1008 and ledge 1014 engages tab 1010, first segment 305 may be prevented from detaching from second segment 307. A linear force that is strong enough to deform ledges 1012 and 1014 around tabs 1008 and 1010 may be used to detach male connector 301 from female connector 303. The linear force may be strong enough to mechanically separate ledges 1012 and 1014 from tabs 1008 and 1010.

Casing 302 may include tang 1004. Casing 320 may include a second cutout (not shown). The second cutout may include a bevel. The bevel may be shaped to receive tang 1004. When male connector 301 is interlocked with female connector 303, tang 1004 may be received by the second cutout. The second cutout may include ledges. Tang 1004 may include tab 1016. Tang 1004 may include tab 1018. Tabs 1016 and 1018 may extend from tang 1004.

When female connector 303 is being pushed into male connector 301, the ledges may deform around tabs 1016 and 1018. The ledges may deform around tabs 1016 and 1018 so that the second cutout can receive tang 1004. When the second angle cutout receives tang 1004, the ledges may engage tabs 1016 and 1018. When the ledges engage tabs 1016 and 1018, male connector 301 may be interlocked with female connector 303. When the ledges engage tabs 1016 and 1018, first segment 305 may be prevented from detaching from second segment 307. A linear force that is strong enough to deform the ledges around tabs 1016 and 1018 may be used to detach male connector 301 from female connector 303. The linear force may be strong enough to mechanically separate the ledges from tabs 1016 and 1018.

Figure 11:
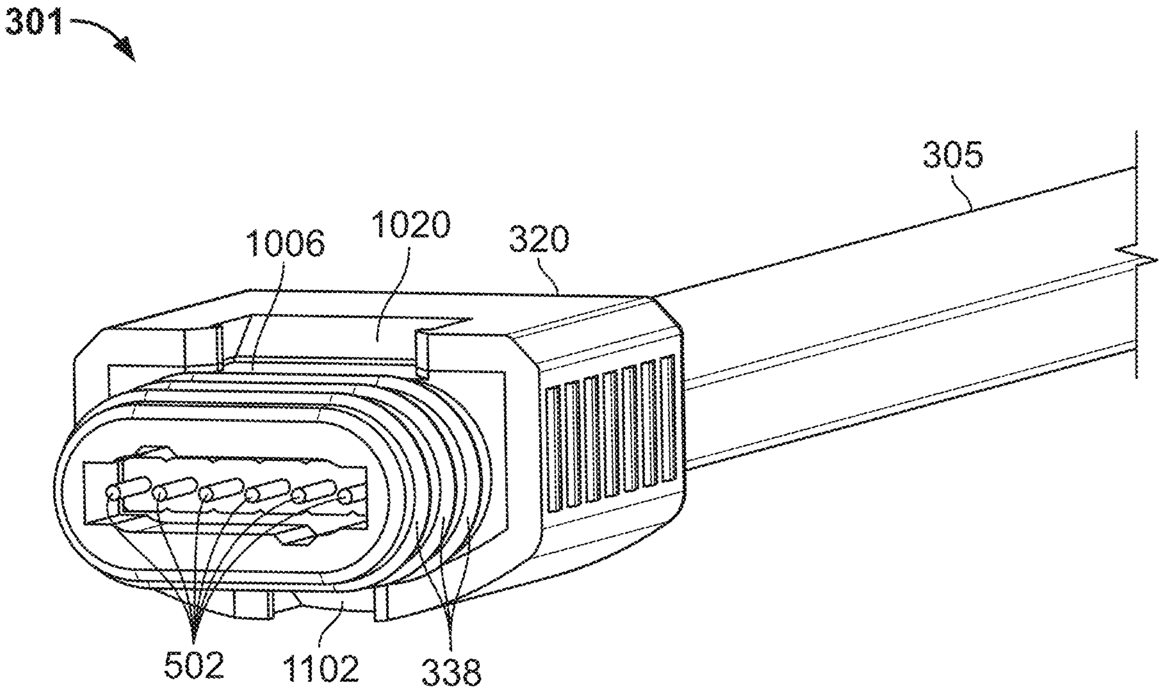
FIG. 11 shows schematically illustrative apparatus in accordance with the principles of the invention.

FIG. 11 shows a view of male connector 301.

Cutout 1102 may be the second cutout not shown in FIG. 10.

Figure 12:
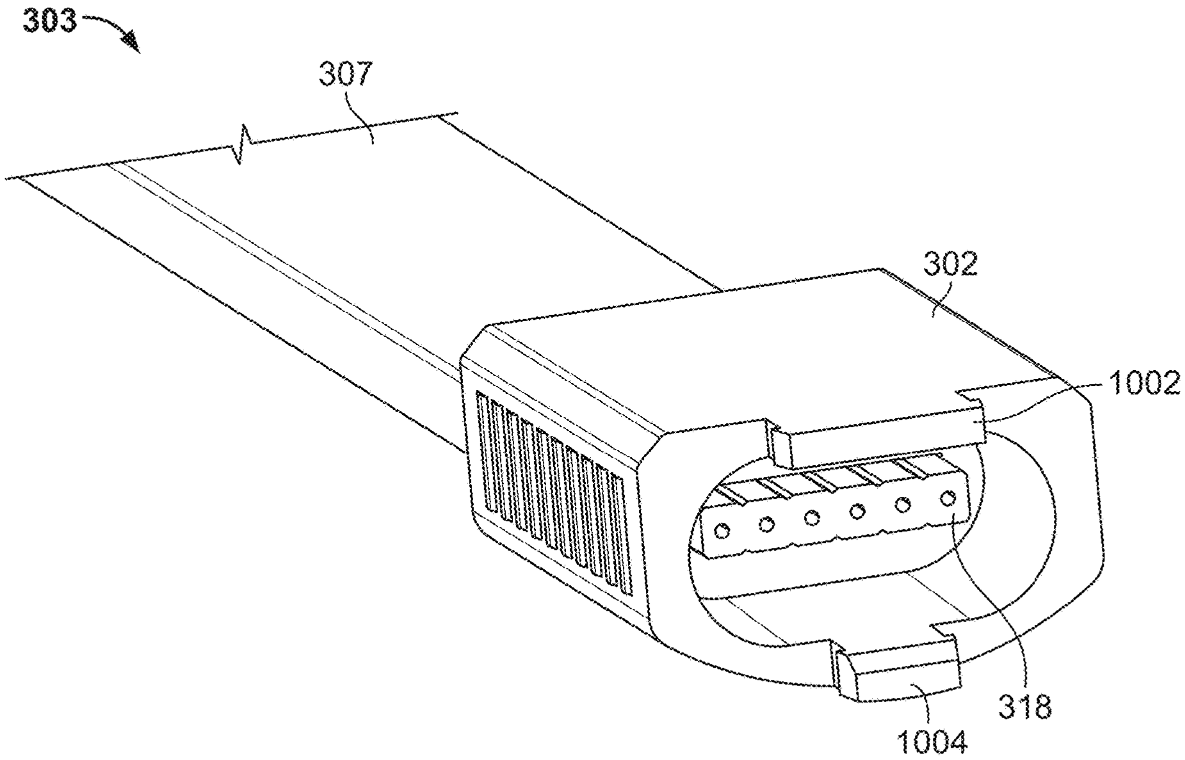
FIG. 12 shows schematically illustrative apparatus in accordance with the principles of the invention.

FIG. 12 shows a view of male connector 301.

Figure 13:
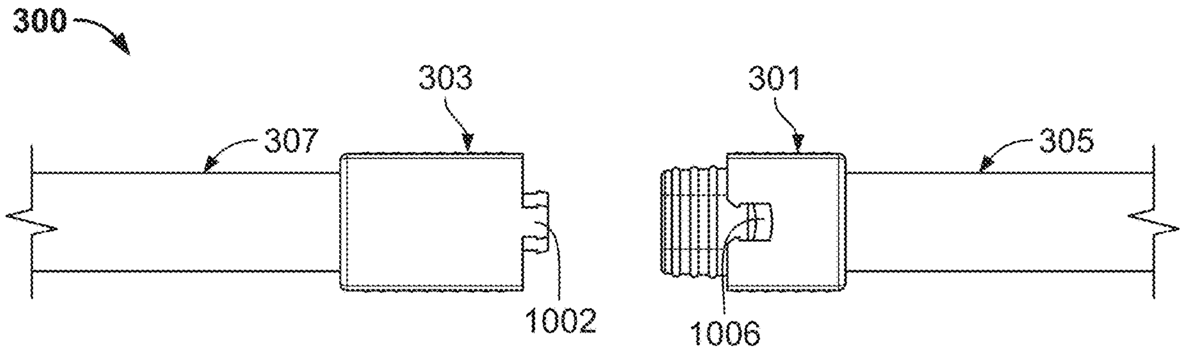
FIG. 13 shows schematically illustrative apparatus in accordance with the principles of the invention.

FIG. 13 shows a top view of connector 300.

Figure 14:
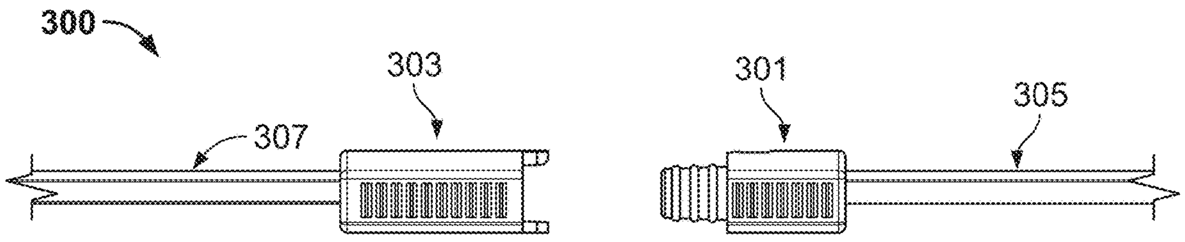
FIG. 14 shows schematically illustrative apparatus in accordance with the principles of the invention.

FIG. 14 shows a side view of connector 300.

Figure 15:
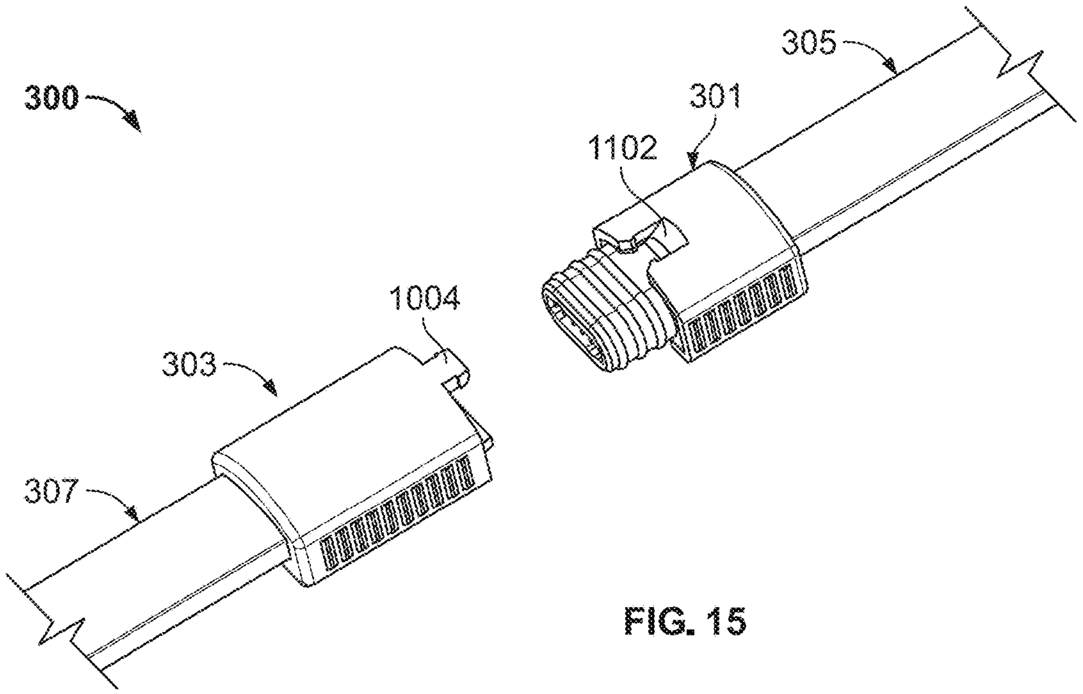
FIG. 15 shows schematically illustrative apparatus in accordance with the principles of the invention.

FIG. 15 shows a bottom view of connector 300.

Figure 16:
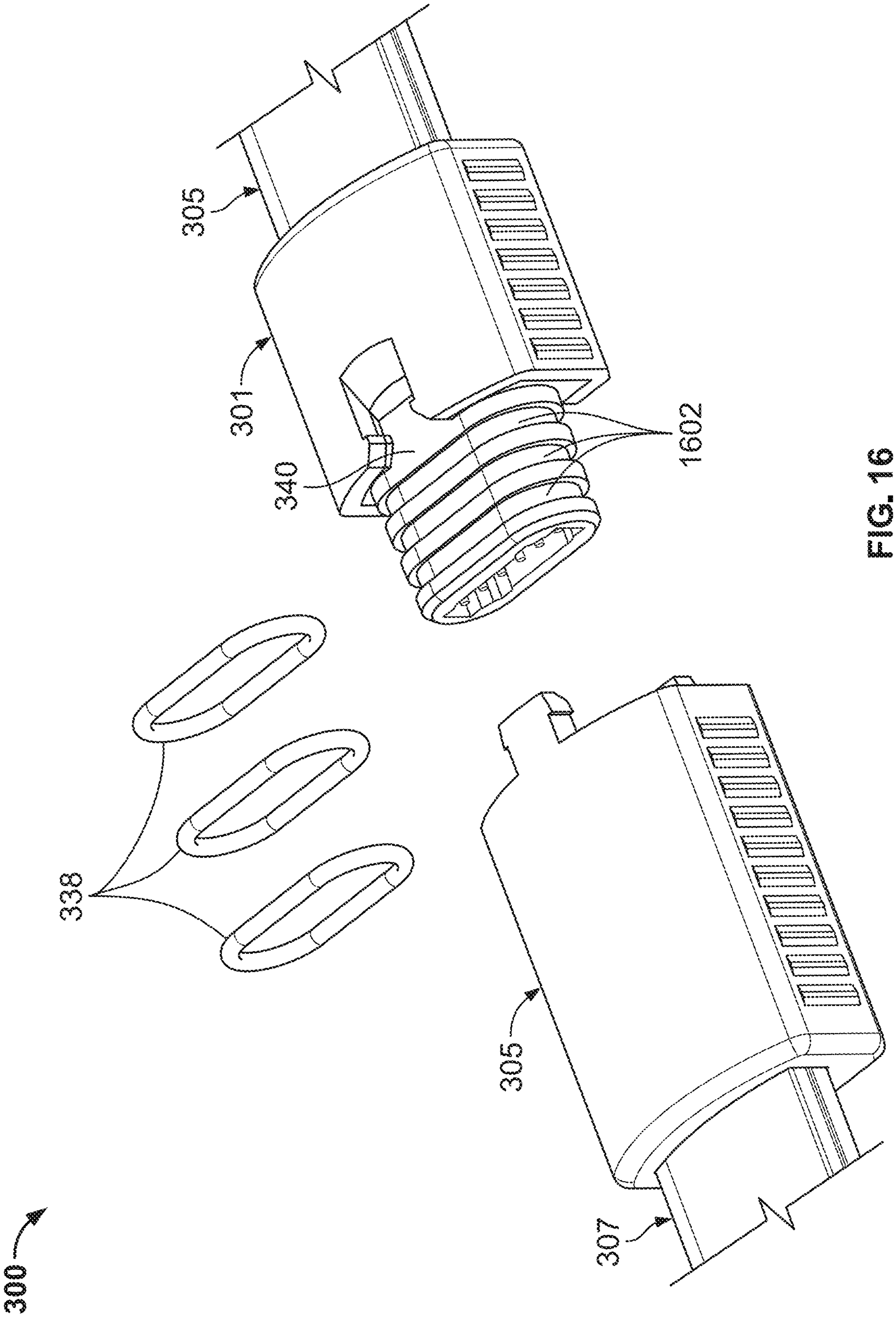
FIG. 16 shows schematically illustrative apparatus in accordance with the principles of the invention.

FIG. 16 shows another view of connector 300.

Extension 340 may include grooves 1602. Grooves 1602 may receive sealing rings 338.

FIG. 17 shows a top view of connector 300 when male connector 301 is interlocked with female connector 303.

Figure 18:
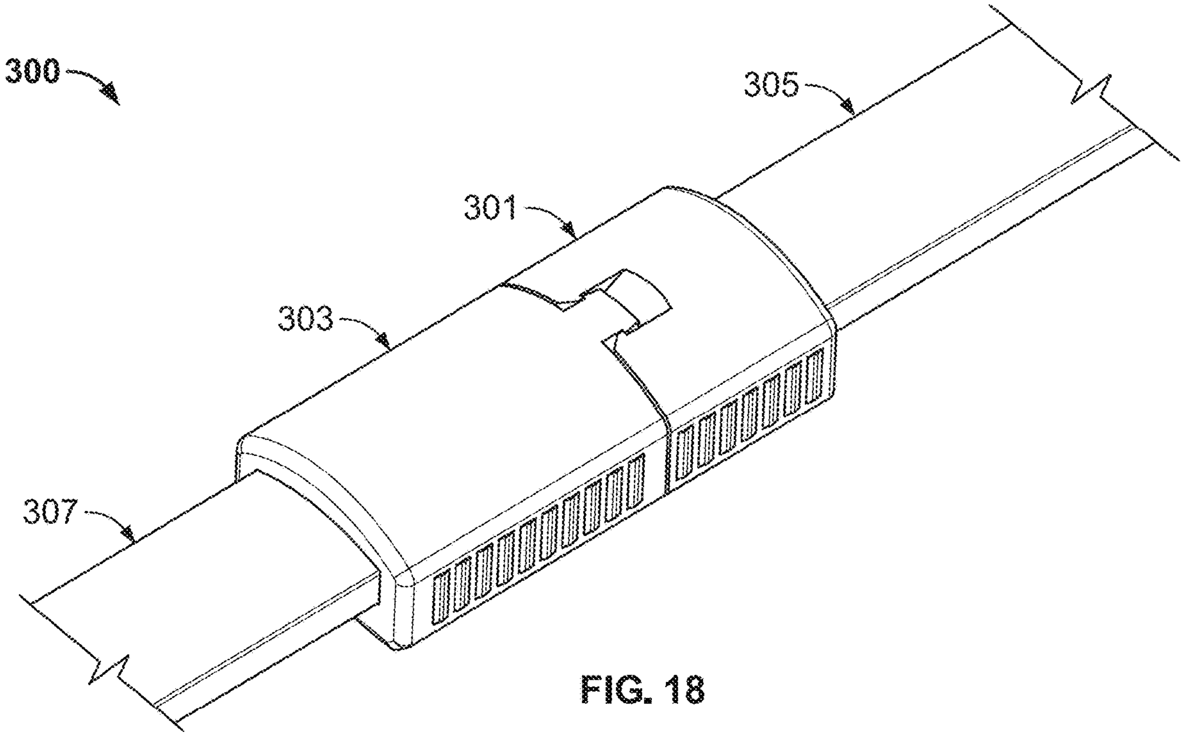
FIG. 18 shows schematically illustrative apparatus in accordance with the principles of the invention.

FIG. 18 shows a bottom view of connector 300 when male connector 301 is interlocked with female connector 303.

Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the methods associated therewith.

Functions of electrical circuits, or parts thereof, disclosed herein may be incorporated into or combined with other electrical circuits, or parts thereof, disclosed herein, or with other suitable electrical circuits.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus, methods and algorithms for providing light have been provided. Persons skilled in the art will appreciate that the present invention may be practiced by other than the described embodiments, which are presented for purposes of illustration rather than of limitation.

What is claimed is:

1. A light tape comprising:

a first segment configured to extend along an axis, the first segment including:
- a light emitting diode ("LED");
- a first end;
- a second end;
- a first male connector connected to the first end, the first male connector including:
  - a conductor pin;
  - an extension defining a groove; and
  - a sealing ring configured to be seated in the groove;
- a first female connector connected to the second end, the first female connector:
  - defining a hole configured to receive the conductor pin; and
  - including a receptacle configured to receive the extension;

a cutout that includes a first ledge and a second ledge, the first ledge and the second ledge defining an opening therebetween; and a tang that includes a first tab extending from a first side of the tang and a second tab extending from a second side of the tang, the tang having a width extending from the first tab to the second tab, the width being wider than the opening;

wherein:

the first male connector is configured to releasably interlock along the axis with a second female connector connected to a second segment;

the first male connector and the second female connector are configured to releasably interlock without rotation of the second female connector relative to the first male connector about the axis;

the width is configured to be pushed, along the axis, through the opening; and when the first male connector and the second female connector are releasably interlocked:

the first tab is engaged with the first ledge; and the second tab is engaged with the second ledge.

2. The light tape of claim 1 wherein:

the first female connector is configured to releasably interlock along the axis with a second male connector connected to a third segment; and the first female connector and the second male connector are configured to releasably interlock, without rotation of the second male connector relative to the first female connector about the axis.

3. The light tape of claim 1 wherein the second segment is configured to provide power to the first segment via a plurality of wires.

4. The light tape of claim 3 further comprising, when the LED is a first LED having a first correlated color temperature ("CCT"):

a second LED source having a second CCT;

a third LED source having a third CCT;

a fourth LED source having a fourth CCT; and a fifth LED source having a fifth CCT.

5. The light tape of claim 4 wherein the plurality of wires are configured to provide modulated currents to each of the first LED, second LED, third LED, fourth LED and fifth LED.

6. The light tape of claim 3 wherein:

the conductor pin is included in an array of conductor pins; and the hole is included in an array of holes;

wherein each hole included in the array of holes is configured to receive a conductor pin from the array of conductor pins.

7. The light tape of claim 6 wherein:

the first segment includes a printed circuit board ("PCB") including a plurality of traces;

each conductor pin included in the array of conductor pins is configured to be electronically connected to a trace; and when the first segment and the second segment are releasably interlocked, each trace is configured to be electronically connected to a wire from the plurality of wires.

8. The light tape of claim 1 wherein the first male connector and the second female connector are configured to interlock in response to a pushing force exerted along the axis.

9. The light tape of claim 1 wherein the first male connector is configured to release from the second female connector solely in response to a pulling force exerted along the axis.

10. The light tape of claim 2 wherein the first female connector and the second male connector are configured to interlock in response to a pushing force exerted along the axis.

11. The light tape of claim 2 wherein the first female connector is configured to release from the second male connector solely in response to a pulling force exerted along the axis.

12. The light tape of claim 1 wherein:

the first segment includes a first printed circuit board ("PCB");

the LED is included in a first array of LEDs; and the first array of LEDs is disposed on the first PCB.

13. The light tape of claim 12 wherein LEDs included in the first array of LEDs include first correlated color temperature ("CCT") LEDs and second CCT LEDs.

14. The light tape of claim 12 further comprising a first cover configured to cover the first array of LEDs.

15. The light tape of claim 14 wherein the first cover includes a phosphor layer.

16. The light tape of claim 12 further comprising a second cover configured to cover the first PCB.

17. The light tape of claim 16 wherein the second cover includes a translucent material.

18. The light tape of claim 17 wherein the translucent material includes silicone.

19. The light tape of claim 1 wherein:

the extension further defines a first bore;

the conductor pin is disposed inside the first bore; and the conductor pin does not extend beyond the first bore.

20. The light tape of claim 19 wherein:

the receptacle further defines a second bore;

the hole is disposed inside the second bore; and the hole does not extend beyond the second bore.

21. The light tape of claim 1 wherein:

the tang is a first tang;

the first tang extends from a top side of the second female connector;

the second female connector includes a second tang; and the second tang extends from a bottom side of the second female connector, the second tang being parallel to the first tang.

22. The light tape of claim 21 wherein:

the cutout is a first cutout;

the first cutout is disposed on a top side of the first male connector; and the first male connector includes a second cutout disposed on a bottom side of the first male connector;

wherein, when the first male connector is releasably interlocked with the second female connector:

the first cutout is configured to receive the first tang; and the second cutout is configured to receive the second tang.

23. The light tape of claim 2 wherein:

the tang is a first tang;

the first tang extends from a top side of the first female connector;

the first female connector includes a second tang; and the second tang extends from a bottom side of the first female connector, the second tang being parallel to the first tang.

24. The light tape of claim 23 wherein:

the cutout is a first cutout;

the first cutout is disposed on a top side of the second male connector; and the second male connector includes a second cutout disposed on a bottom side of the second male connector;

wherein, when the second male connector is releasably interlocked with the first female connector:

the first cutout is configured to receive the first tang; and the second cutout is configured to receive the second tang.

25. The light tape of claim 1 wherein:

the groove is one of a plurality of grooves;

the sealing ring is one of a plurality of sealing rings; and each of the plurality of sealing rings is configured to be seated in one of the plurality of grooves.

26. The light tape of claim 25 wherein when the first male connector and the second female connector are releasably interlocked, the plurality of sealing rings are configured to seal between the first segment and the second segment.

27. The light tape of claim 2 wherein:

the groove is one of a plurality of grooves;

the sealing ring is one of a plurality of sealing rings; and each of the plurality of sealing rings is configured to be seated in one of the plurality of grooves.

28. The light tape of claim 27 wherein when the second male connector and the first female connector are releasably interlocked, the plurality of sealing rings are configured to seal between the first segment and the third segment.

* * * * *